United States Patent [19]

Murata et al.

[11] Patent Number: 5,563,992
[45] Date of Patent: Oct. 8, 1996

[54] FACE IMAGE CREATION DEVICE AND METHOD USING PART IMAGES OF THE PLURAL PARTS OF THE FACE IMAGE

[75] Inventors: Yoshiyuki Murata; Yoshito Yamaguchi, both of Tokyo, Japan

[73] Assignee: Casio Computer Co., Ltd., Tokyo, Japan

[21] Appl. No.: 252,903

[22] Filed: Jun. 2, 1994

[30] Foreign Application Priority Data

Jun. 7, 1993 [JP] Japan .................. 5-164211

[51] Int. Cl.$^6$ ............................................. G06F 15/00
[52] U.S. Cl. ............................................. 395/135; 395/133
[58] Field of Search ............................. 395/141, 135, 395/133, 155, 161

[56] References Cited

U.S. PATENT DOCUMENTS

| | | | |
|---|---|---|---|
| 4,701,752 | 10/1987 | Wang | 395/157 |
| 4,823,285 | 4/1989 | Blancato | 395/135 |
| 5,060,171 | 10/1991 | Steir et al. | 395/135 |
| 5,196,922 | 3/1993 | Yeomans | 395/135 |
| 5,375,195 | 12/1994 | Johnston | 395/135 |
| 5,404,426 | 4/1995 | Usami et al. | 395/135 |

*Primary Examiner*—Mark K. Zimmerman
*Assistant Examiner*—Joseph R. Burwell
*Attorney, Agent, or Firm*—Frishauf, Holtz, Goodman, Langer & Chick

[57] ABSTRACT

An object image creation device and method which combine images of the parts which compose an object into an object image. A storage stores data on a plurality of kinds of images for each of the parts which compose one half of an object. Any images are selected one from among a stored plurality of kinds of images of each of the parts. The selected images of the respective parts are combined into a first half object image. A second half object image symmetrical with the first half object image is produced on the basis of the first half object image. The first and second half object images are combined into a complete object image.

10 Claims, 18 Drawing Sheets

FIG.3 B

| FACE CHARACTERISTIC DATA | | |
|---|---|---|
| a : SEX | b : PART NO. | C : PATTERN NO. |
| 1(MALE) | 1(1~6) | 01(01~20) |

FIG.3C

| a b c | SEX | a b c | KINDS OF PARTS | a b c | KINDS OF PATTERNS |
|---|---|---|---|---|---|
| 1 x x | MALE | 1 1 x | HAIR STYLE | 1 1 01 | HAIR PARTED AT 7:3 |
|  |  | 1 2 x | CONTOUR | 1 1 02 | SHAVED HEAD |
|  |  | 1 3 x | EYES |  | LONG-HAIRED HEAD |
| a b c |  | 1 4 x | EYEBROWS | 1 1 03 | CLOSE-CROPPED HEAD |
| 0 x x |  | 1 5 x | NOSE | 1 1 04 | ⋮ |
|  | FEMALE | 1 6 x | MOUTH | 1 1 20 | HAIR PARTED AT 8:2 |

SCREEN DATA ROM

FIG. 5 A

K — SEX ?
  01 : MALE
  02 : FEMALE

FIG. 5 B

HAIR STYLE ?
  01 : HAIR PARTED AT 7 : 3
  02 : SHAVED HEAD

FIG. 5 C

EYES?
  01 : ROUND DOUBLE EYELID
  02 : OVAL
  03 : OBLIQUE

FIG. 5 D

EYEBROWS?
  01 : ARCHED
  02 : END-LOWERING

INITIALLY SET
(FOR ONLY
LEFT-HAND
FACE HALF)

REVERSED &
COMBINED
(RIGHT-HAND
FACE HALF
DUPLICATED)

HAIR STYLE
COMBINED

EYEBROWS
ROTATED

FACE IMAGE CREATION DEVICE AND METHOD USING PART IMAGES OF THE PLURAL PARTS OF THE FACE IMAGE

BACKGROUND OF THE INVENTION

The present invention relates to object image creation devices which combine a plurality of part images into a complete object image and more particularly to an object image creation device and method which selects, duplicates, and combines desired images, one from a stored plurality of images of each of the parts which compose one of halves of an object.

Conventionally, an object image creation device is known which selects any images of the parts of an object, one from among a plurality of kinds of images of each part having any shape, data on which is stored beforehand, and combines the selected images into a complete object image.

Therefore, if an object image very similar to the shape of an object to be created is intended to be created, as many kinds of part images as possible would be required to be prepared beforehand for each of the parts of the object image..

However, if as many kinds of part images as possible are to be prepared beforehand for each part, a storage of a large-scaled capacity would be required. Thus, the whole device would become expensive, large-scaled and weighty, disadvantageously.

SUMMARY OF THE INVENTION

The present invention is intended to eliminate such problems.

It is a first object of the present invention to provide a small, lightweight, inexpensive object image creation device and a method of creating an object image inexpensively.

It is a second object of the present invention to provide an object image creation device and method which is capable of creating an object image which the user desires, using a storage of a small capacity.

It is a third object of the present invention to provide a small storage useful for the object image creation device and method.

In order to achieve the first object of the present invention, the present invention provides an object image creation device, comprising:

storage means storing data on a plurality of kinds of images of each of parts which compose one of halves of an object;

first half object image producing means for selecting any part images, one from among the plurality of kinds of images of each of the parts, data on which images is stored in the storage means, and for combining the selected images into a first half object image;

second half image producing means for producing a second half object image symmetrical with the first half object image on the basis of the first half object image; and object image producing means for combining the first and second half object images into a complete object image.

In order to achieve the above second object, the present invention provides an object image creation method, comprising:

a first step of selecting any part images, one from among a plurality of kinds of images of each of the parts which composes one of halves of an object, data on which images is stored;

a second step of combining the selected images of the parts into a first half object image;

a third step of producing a second half object image symmetrical with the first half object image on the basis of the first half object image; and a fourth step of combining the first and second half object images into a complete object image.

In order to achieve the above third object, the present invention provides an object image storage device for use with an object image creation apparatus in which any images of the parts which compose one of halves of an object are selected by selecting means, one from among a plurality of kinds of images of each of the parts, and the selected images are combined into an object image, the device comprising:

first storage means storing a plurality of kinds of images each of the parts which compose the one of the halves of the object to be produced by the object image creation apparatus;

second storage means for storing data on a first half object image composed of a combination of any images are selected by the selecting means from among the plurality of images of each part, data on which is stored in the first storage means, and data on a second half object image symmetrical with the first half object image formed on the basis of the first half object image such that those first and second half object images are combined into a complete object image.

A face image is made of up plural parts, such as the overall shape, eyes, eyebrows, nose, mouth, etc. In accordance with the present invention, only half of each part or feature is stored in memory. Then, a first half face image is formed from these different parts. The first half face image is then inverted to form a second symmetrical half face image, which is combined with the first half face image to form a complete face image. The hair, which is not symmetrical, is not formed as a half face image, but is added to the complete face image. Thus, the store space needed to store the plural parts is greatly reduced. For example, it is only necessary to store an image for a left eye, the right eye being formed as a mirror image of the left eye.

BRIEF DESCRIPTION OF THE DRAWINGS

FIG. 3B illustrates examples of data items stored at face characteristic data locations of a work RAM.

FIG. 3C illustrates the relationship between examples of data items stored at face characteristic data locations of the work RAM and a sex, the kind of a part, etc., designated by those data items.

FIGS. 5A–5D illustrate displayed examples of screen data items.

DESCRIPTION OF THE PREFERRED EMBODIMENT

An embodiment of an object image inventive object image creation device will be described below with respect to the accompanying drawings.

Figure 1:
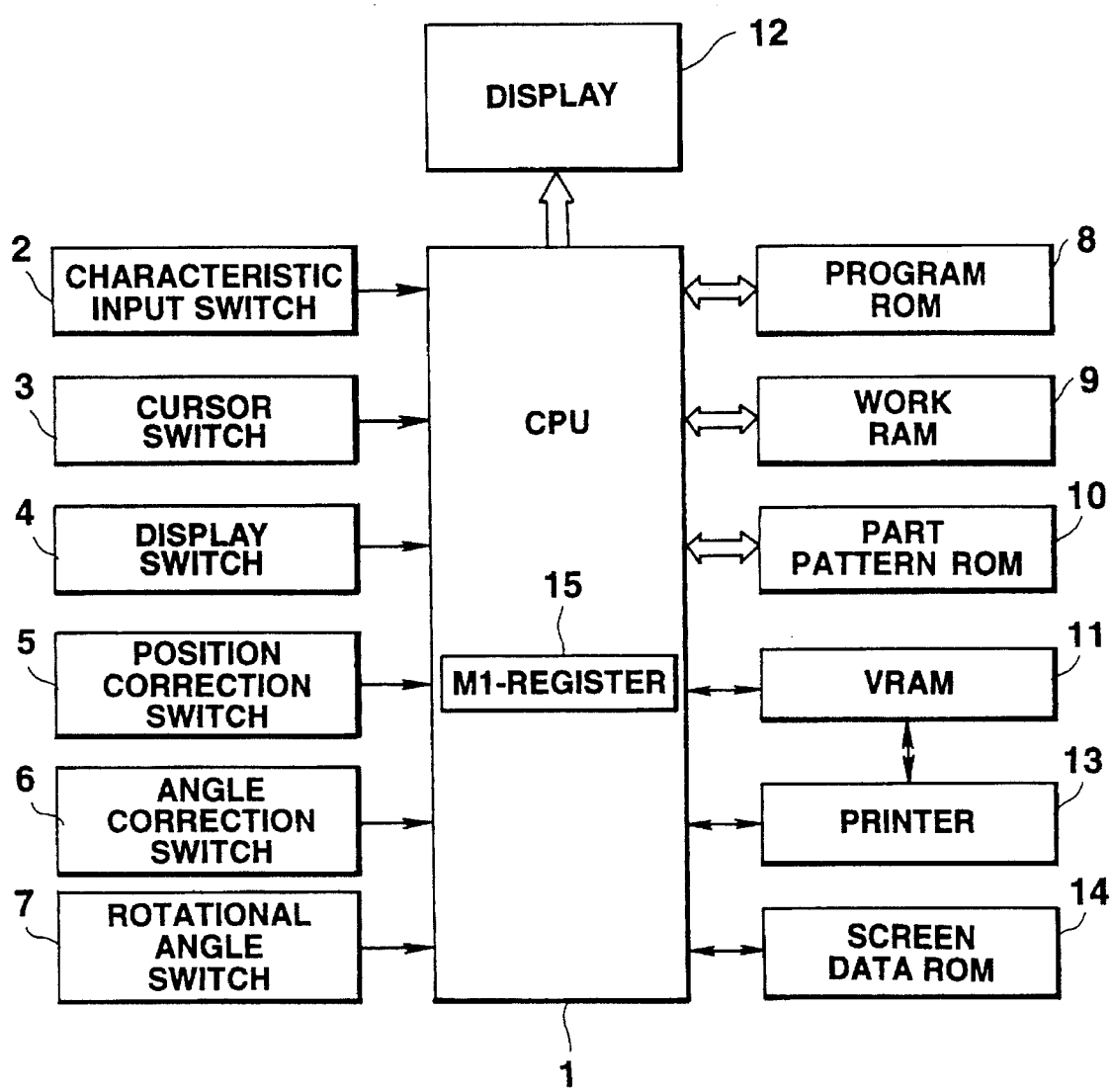
FIG. 1 is a schematic of one embodiment of an object image creation device according to the present invention.

FIG. 1 is a schematic of an embodiment of the object image creation device.

In FIG. 1, the face image creation device includes a CPU 1, a characteristic input switch 2, a cursor switch 3, a display switch 4, a position correction switch 5, an angle correction switch 8, a rotational angle switch 7, a program ROM 8, a work RAM 9, a part pattern ROM 10, a VRAM (Video RAM) 11, a display 12, a printer 13 and a screen data ROM 14.

The CPU 1 controls the whole face image creation device. When the characteristic input switch 2, cursor switch 3, display switch 4, and position correction switch 5 designate face part patterns, characteristics, and etc., the CPU 1 responds to that designation to read and combine data on patterns of the respective parts of a face from the part pattern ROM 10 in accordance with program data stored in the program ROM 8 and part data stored in the work RAM 9 to thereby create the user's or another's face image.

In this case, the CPU 1 selectively sequentially reads data items on kinds of patterns of parts which compose one of halves of a face image, one item from among data items on kinds of patterns of each part stored in the part pattern ROM 10 and reverses them sequentially with respect to corresponding predetermined positions, combines the original selected part patterns and the reversed part patterns to form a complete face image.

When the position correction switch 5, angle correction switch 8 and rotational angle switch 7 designate a part patterns whose position and angle are to be corrected, the CPU 1 changes the position of the designated part pattern and the tilt of the part patterns by predetermined angle and displays them.

The characteristic input switch 2 is operated to display a screen (FIG. 5A) which selects data on the sex of a person having a face image, and screens (FIGS. 5B–5D) which select data on face characteristics indicative of the characteristics of the respective parts (hair style, contour, eyebrows, eyes, nose, and mouth) of the face (FIGS. 5B, 5C), in order to create the face image.

The cursor switch 3 is operated to select any data items from among data on the sex and data on the respective face characteristics of the screen data displayed already on the display 12 by the operation of the characteristic input switch 2, in order to create the face image. Each time the cursor switch 3 is operated, the cursor K is moved up or down on the screen of the display 12 to thereby select data corresponding to the position where the cursor has moved. In the present embodiment, when the cursor switch 3 is operated, one of numerals "01", "02", . . . annexed to the corresponding screen data items responds to the operation of the cursor switch 3 to be displayed in a going-on/off manner, as shown in FIGS. 5A–5D. Alternatively, a mouse may be used to select desired data in place of the cursor switch 3.

The display switch 4 is operated to display stored face image data on the display 12.

The position correction switch 5 is, for example, an up-down type push button switch which is operated to correct the position of a part pattern relative to the whole face image.

The angle correction switch 8 is, for example, an up-down type push button switch which is operated to correct the tilt angle of the pattern of a part "eyebrow" displayed on the display 12 relative to the whole face image.

The rotational angle switch 7 is, for example, operated to rotate a pattern of a part "eye" displayed on the display 12.

The program ROM 8 stores a control program for the CPU 1, the contents of which program will be shown later in FIGURES concerned.

The work RAM 9 is a work area used in the control of the CPU 1.

Figure 2:
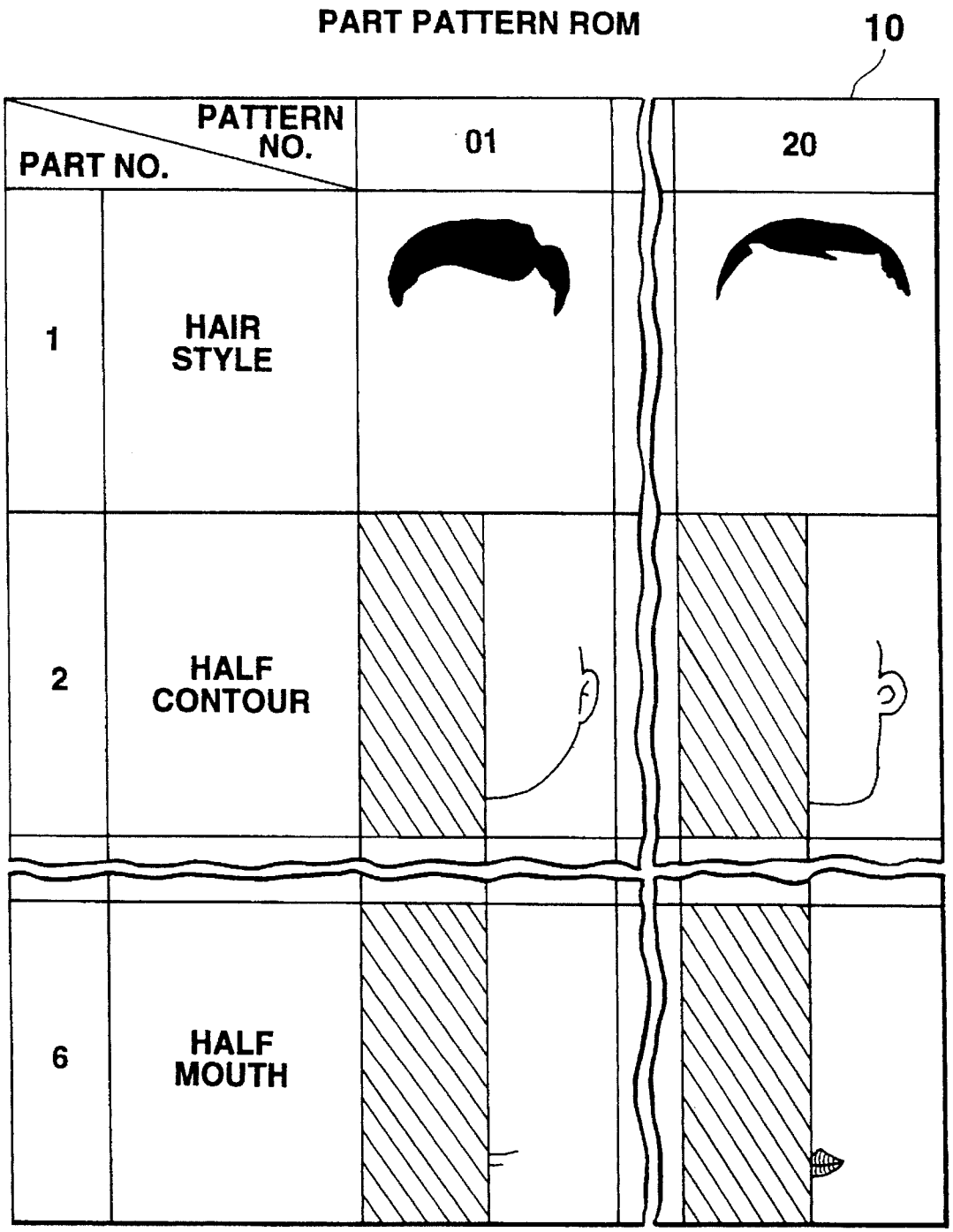
FIG. 2 illustrates examples of part patterns, data on which is stored in a part pattern ROM.

As shown in FIG. 2, the part pattern ROM 10 stores data on a plurality of kinds of parts patterns for each of the parts of a face image. In the present embodiment, the number of kinds of parts of the face is N; i.e., N=1 denotes a part "hair style" for a face; N=2 denotes a part "half contour" of the face; N=3 denotes a part "eye" in the face; N=4 denotes a part "eyebrow" in the face; N=5 denotes a part "half nose" in the face; N=6 denotes a part "half mouth" in the face. The present invention is not limited to the example of FIG. 2, but may include other parts patterns such as a half trunk, arm, hand, and leg.

As shown in FIG. 2, data items on the kinds of part patterns of each of the parts are stored in correspondence to the pattern numbers in the part pattern ROM 10. For example, in the case of the part "hair style" for N=1, data items on 20 kinds of different part patterns for "hair style" are stored beforehand along with the corresponding numbers "01"–"20". Similarly, data items on part patterns of each of other parts "half contour", "eye", and "eyebrow" of the face are stored beforehand in correspondence to pattern numbers "01"–"20".

The respective part patterns for the face image should be originally stored for all the right- and left-hand parts which compose the face image. However, the face image is composed of right- and left-hand substantially symmetrical part patterns. Thus, in this embodiment, all data items on the right- and left-hand parts are not stored, but data items on only the left-hand parts are stored. Thus, half of the number of part patterns is only required to be provided compared with the case where data on all the right- and left-hand part patterns of the parts which compose a face image is stored. Thus, the storage area is halved and the storage capacity for the part patterns is reduced accordingly.

Figure 3A:
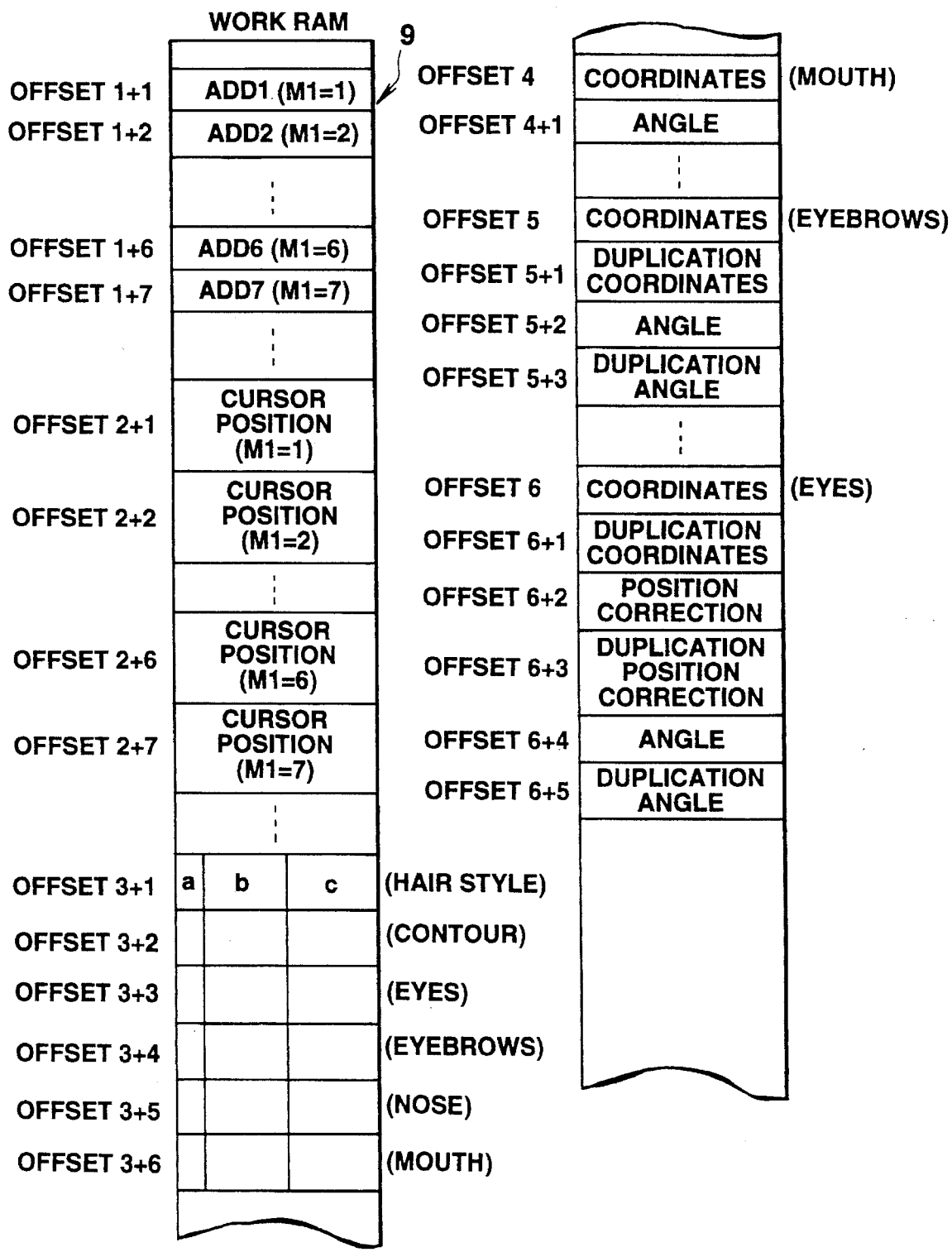
FIG. 3A illustrates examples of data items stored at data storage locations of a work RAM.
Figure 4:
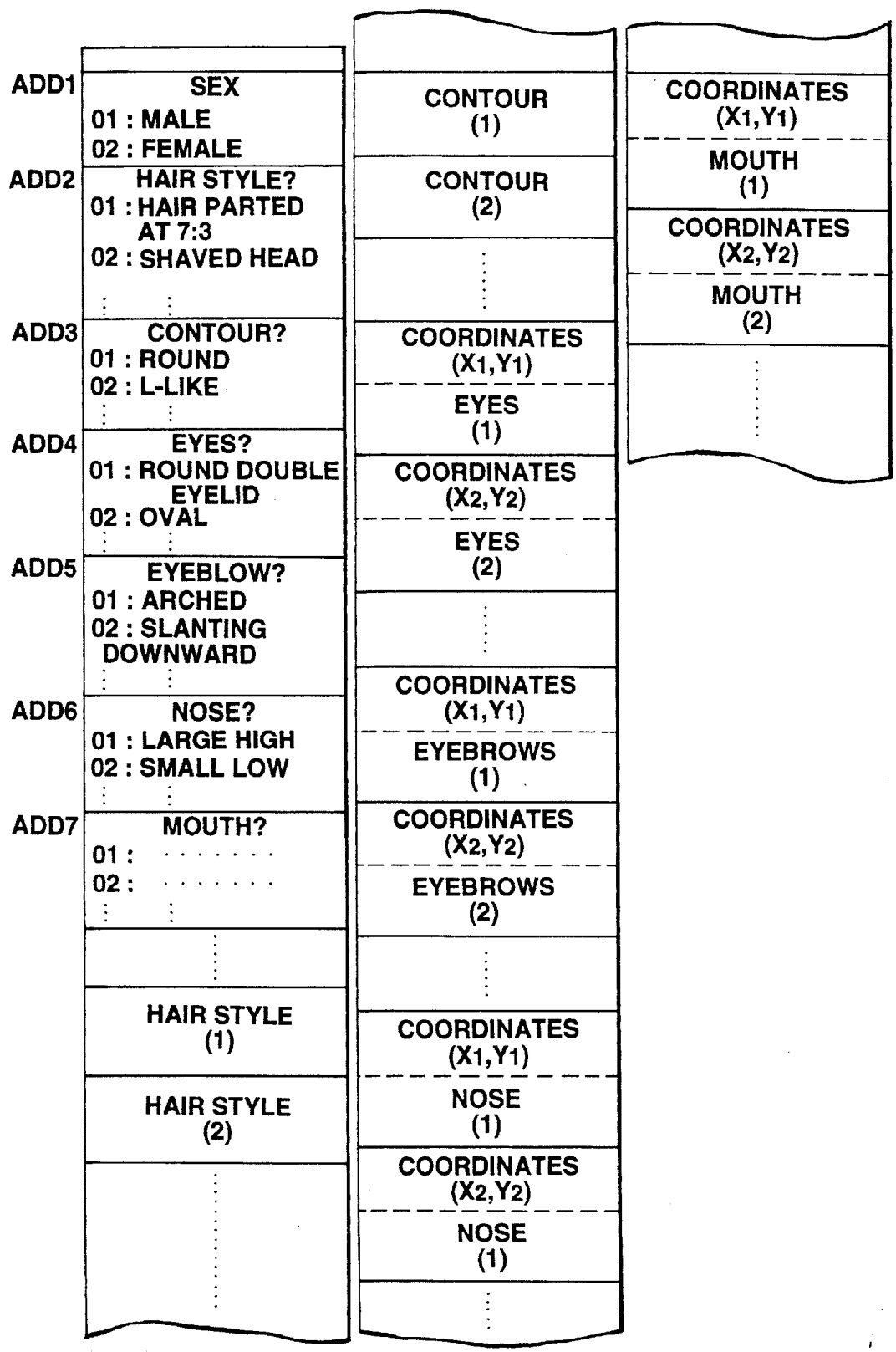
FIG. 4 illustrates examples of screen data stored in a screen data ROM.

As shown in FIG. 3A, the work RAM 9 is used as a work area when the CPU 1 performs various controlling operations. Various data items are stored at respective storage locations corresponding to addresses (OFFSET1+1) to (OFFSET6+5) in the work RAM 9. More particularly, respective address data ADD1–ADD7 to designate selected screen data of FIG. 4 are stored at selected screen locations corresponding to addresses (OFFSET1+1) to (OFFSET1+ 7). Data items on the positions of the operated cursor switch 3 are stored at cursor position locations corresponding to addresses (OFFSET2+1) to (OFFSET2+7).

Data items on face characteristics for the respective parts are stored at face characteristic data locations corresponding to addresses (OFFSET3+1) to (OFFSET3+6). As shown in FIG. 3B, the respective data items on the face characteristics are composed of a plurality of bits where the most-least significant bits indicate corresponding sex, part number, and part pattern number data items in this order. FIG. 3C show the relationship between those sex, part number, and part pattern number data items, and image data items on a sex, parts, and part patterns designated by those corresponding data items.

The sex data item is stored at a sex data location (designated by a) for the most significant bit. It is composed of one bit. As shown in FIG. 3C, the bit "1" indicates a male while the bit "0" indicates a female.

The part number data item is stored at each of part number locations (designated by b) for the second bit. As shown in FIG. 3C, the part number data is selected by the user from among data items on part numbers "1"–"6" corresponding to six kinds of parts "hair style", "contour", . . . .

The part pattern number data item is stored at a part pattern number location (designated by c) for the third bit. The part pattern number data item is selected by the user from among data items on the part pattern numbers "01"–"20" in the part pattern ROM 10. For example, as shown in FIG. 3C, if a part pattern for a "hair parted at 7:3" of hair style is selected by the user, data on a part pattern number "01" corresponding to the part pattern is stored. Thus, this part pattern number "01" is stored at a pattern location (shown by c).

When the shapes and positions of the eyes, eyebrows and mouth are changed among the part patterns for the face image, they greatly change the impression of the face image to the user. Thus, in the present embodiment, a process for changing the position, rotational angle, etc., of those part patterns is performable and an area for storing coordinate and angle data items on those eyes, eyebrows and mouth is provided in the work RAM 9.

Data on the mouth is stored at addresses OFFSET4 and (OFFSET4+1). More specifically, data on coordinates which is the rotational center of the mouth is stored at address OFFSET4. Data on an angle (designated by the angle correction switch 6) through which the mouth is rotated is stored at address (OFFSET4+1).

Data items on the two respective eyebrows on the face are stored at addresses OFFSET5, (OFFSET5+1), (OFFSET5+ 2) and (OFFSET5+3). More specifically, data on the coordinates of the rotational center of one of the two eyebrows (for example, the left-hand eyebrow) is stored at address OFFSET5. Data on duplication coordinates (of the rotational center of the other eyebrow (for example, right-hand eyebrow)) when the other eyebrow is duplicated and used is stored at address (OFFSET5+1).

Data on an angle (designated by the angle correction switch 6) through which one eyebrow (for example, left-hand eyebrow) is rotated is stored at address (OFFSET5+2). Data on a duplication angle through which the other eyebrow (for example, right-hand eyebrow) is rotated when the other eyebrow is duplicated and used is stored at address (OFFSET5+3).

Data items on the two eyes in the face are stored at addresses OFFSET6–(OFFSET6+5). More specifically, data on the coordinates of the rotational center of one of the two eyes (for example, the left-hand eye) in the face image is stored at address OFFSET6. Data on duplication coordinates of the rotational center of the other eye (for example, right-hand eye) when the other eye is duplicated and used as a duplication of the one eyebrow is used is stored at address (OFFSET6+1). Data on correction of the position of one eye (for example, the left-hand eye) and designated by the position correction switch 5) is stored at address (OFFSET6+2). Data on duplication position correction for correction of the other eye (for example, right-hand eye) when the other eye is duplicated and used is stored at address (OFFSET6+3).

Data on an angle (designated by the angle correction switch 6) through which one eye (for example, left-hand eye) is rotated is stored at address (OFFSET6+4). Data on a duplication angle through which the other eye is rotated when the other eye (for example, right-hand eye) is duplicated and used is stored at address (OFFSET6+5).

As shown in FIG. 4, the screen data ROM 14 pre-stores screen data displayed on the display 12 when the face image is created. The data items in the screen data ROM 14 are designated by respective address data items ADD1–ADD7 for screen data stored at addresses (OFFSET1+1)–(OFFSET1+7) in the work RAM 9.

In FIG. 4, a screen data item used for the screen when a sex is selected is stored at a location corresponding to the address ADD1. As shown in FIG. 5A, a screen which urges the user to designate a sex in response to "sex ?", "01: male" and "02: female" on the basis of the screen data is displayed on the display In FIG. 4, a screen data item used for the screen when a kind of hair style is selected is stored at a location corresponding to address ADD2. As shown in FIG. 5B, a screen which urges the user to select a kind of hair style on the basis of the screen data is displayed on the display 12.

Similarly, screen data items used for the screen when the respective parts "contour", "eyes", "eyebrows", nose" and mouth" of the face are selected are stored at locations corresponding to addresses ADD3–ADD7. A screen which urges the user to select respective parts "hair style", "contour", "eyes", "eyebrows", nose" and mouth" of the face on the basis of the display screen data is displayed on the display 12 (FIGS. 5A–5D).

Data items on a plurality of part patterns for each of the hair style, contour, etc., are stored at address ADD8 and subsequent addresses. In this case, data on the whole hair style is stored in the form of a bit map and not data on half of the hair style. Data on a left-hand half of the whole contour is stored in the form of bit map. For a pair of right- and left-hand symmetrical part patterns, for example, a pair of eyes, eyebrows and half mouths, data on a part pattern for one of the pair of patterns is stored, as shown in FIG. 2.

The reason why only data items on the patterns of the half contour, eye, eyebrow and half mouth which are disposed in one (right- or left-hand) half of the face image are stored is that they are substantially symmetrical with the corresponding ones disposed on the other (left- or right-hand) half of the face around along a vertical line passing through the face image. In contrast, for example, one (left- or right-hand) half of a "hair parted at 7:3" of hair style obtained when the hair style is cut along its vertical line can not necessarily be symmetrical with the other (right- or left-hand) half of the hair style, so that only one of the halves of the hair style cannot be used for the other half thereof. Thus, storage of data on only one of the halves of the hair style is not employed.

In the case of the pattern of an eye (for example, left-hand eye), data on an eye (1) is stored as data on a first pattern with two parameters including the coordinates $(X_1, Y_1)$ of the rotational position of the eye and the shape of the eye. Data on an eye (2) is stored as a second pattern with two parameters including the coordinates $(X_2, Y_2)$ of the rotational position of the eye and the shape of the eye. Similarly, this applies to data on eyes (3), (4), . . . . (That is, data on a plurality of part patterns of the eyebrows is stored.)

In the case of the pattern of an eyebrow (for example, left-hand eyebrow), data on an eyebrow (1) is stored as data on a first pattern with two parameters including coordinates $(X_1, Y_1)$ of the rotational position of the eyebrow and the shape of the eyebrow. Data on an eyebrow (2) is stored as data on a second pattern with two parameters including the coordinates $(X_2, Y_2)$ of the rotational position of the eyebrow and the shape of the eyebrow. Similarly, this applies to data on eyebrows (3), (4), . . . . (That is, data on a plurality of part patterns of the eyebrows is stored.)

In the case of data on a pattern of a half nose, data on a half nose (1) is stored as data on a first pattern with one parameter including the shape of the half nose. Data on a half nose (2) is stored as data on a second pattern. Similarly, this applies to data on half noses (3), (4), . . . . (That is, data on a plurality of part patterns of the half nose is stored.)

In the case of the pattern of a half mouth (for example, left-hand half mouth), data on a half mouth (1) is stored as data on a first pattern with two parameters including the coordinates $(X_1, Y_1)$ of the rotational position of the half mouth and data on the shape of the half mouth. Data on a mouth (2) is stored as data on a second pattern with two parameters including the coordinates $(X_2, Y_2)$ of the rotational position of the half mouth and the shape of the half mouth. Similarly, this applies to data on mouths (3), (4), . . . . (That is, data on a plurality of part patterns of the half mouth is stored.)

The VRAM 11 stores data on the part patterns of a face image in units of a screen when the face image is created and uses a semiconductor memory, for example.

The display 12 displays a face image, etc., processed under control of the CPU 1. The display 12 displays a face image and various data items while delivering various data to/from the VRAM 11 and the CPU 1. It may be composed of a TV display, a dedicated monitor, a CRT or an LCD.

The operation of the embodiment will be described below. In this embodiment, the part patterns of the parts of the face designated by the operation of the cursor switch 3 are selected one from among a plurality of part patterns provided for each part, and those selected part patterns are combined into a face image, which is then displayed.

Figure 6:
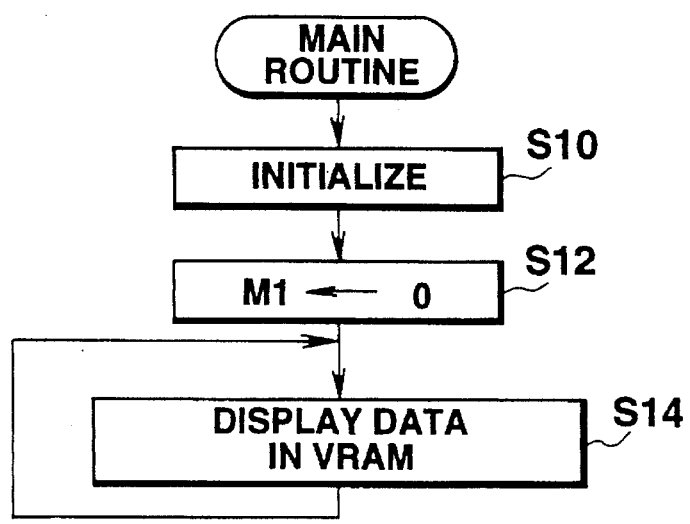
FIG. 6 is a flowchart indicative of a main program for a face image creation process.

The respective steps of creating the face image will be described below. FIG. 6 is a flowchart indicative of a main program for a face image creation process. When this program starts, initialization is performed at step S10 in which the various registers and VRAM 11 are cleared; the subroutines are initialized; and the flags are reset. As shown in FIG. 3A, at the same time, various data items are stored as initial ones at storage locations corresponding to addresses (OFFSET1+1) to (OFFSET6+5) in the work RAM 9.

That is, seven kinds of address data items ADD1–ADD7 for designation of respective screen data items are stored at selected image locations corresponding to addresses (OFFSET1+1) to (OFFSET1+7). Position data items corresponding to the beforehand initially set positions of the cursor K are stored at cursor position locations corresponding to addresses (OFFSET2+1) to (OFFSET2+7). Face characteristic data items on the respective parts are stored at face characteristic data locations corresponding to addresses (OFFSET3+1) to (OFFSET3+6). The face characteristic data is composed of sex, and part number, part pattern number data items which are beforehand initially set, so that those respective data are stored. In the case of this embodiment, data stored at the face characteristic data locations when the initial setting is made includes sex data which is "01" indicative of a male; part number data which is "1" indicative of a hair style; and part pattern number data which is "01" indicative of part pattern number data.

Data items on the coordinates and angles of the eye, eyebrow and half mouth are stored in the work RAM 9 such that a process for changing the position and rotational angle of the part patterns of eye, eyebrow and half mouth can be performed.

Data items on half mouths are stored at addresses OFFSET4 and (OFFSET4+1). More particularly, data on the coordinates of the rotational center of a part pattern for the half mouth is stored at address OFFSET4. Data on an angle through which the part pattern for the half mouth is rotated is stored at address (OFFSET4+1).

Data items corresponding to data items on two eyebrows on the face are stored at addresses OFFSET5, (OFFSET5+1), (OFFSET5+2) and (OFFSET5+3). More specifically, a data item on the coordinates of the rotational center of the pattern of one (for example, the left-hand eyebrow) of the two eyebrows on the face is stored at address OFFSET5. A data item on duplication coordinates as the rotational center of the other eyebrow (for example, the right-hand eyebrow) when the pattern of the other of the two eyebrows is duplicated and used is stored at address (OFFSET5+1).

A data item on an angle through which one (for example, the left-hand eyebrow) of the two eyebrows on the face is rotated is stored at address (OFFSET5+2). A data item on a duplication angle as the rotational angle of the eyebrow when the pattern of the other (for example, the right-hand eyebrow) is duplicated and used is stored at address (OFFSET5+3).

Data items corresponding to respective part patterns of the two eyes in the face are stored at addresses OFFSET6 to (OFFSET6+5). More specifically, data on the coordinates of the rotational center of a part pattern of one (for example, left-hand eye) of the two eyes in the face is stored at address OFFSET6. Data on duplication coordinates (of the rotational center of the other eye) used when the pattern of the other eye (for example, the right-hand eye) is duplicated and used is stored at address (OFFSET6+1). Data on correction of the position of the pattern of one (for example, the left-hand eye) of the two eyes is stored at address OFFSET6+2. Data on correction of a duplication position used when the pattern of the other (for example, the right-hand eye) of the two eyes is duplicated and used is stored at address (OFFSET6+3). Data on an angle through which the part pattern of one eye (for example, left-hand eye) is rotated is stored at address (OFFSET6+4). Data on a duplication angle through which the other eye (for example, the right-hand eye) is rotated when the pattern of the other eye is duplicated and used is stored at address (OFFSET6+5).

At step S12 the value of a pointer M1 register 15 provided in the CPU 1 is cleared to "0". The pointer M1 register 15 is used to designate a total of seven data items on sex, and parts as the respective characteristics of a face when those data items are input.

At step S14 the contents of the VRAM 11 are displayed on the display 12. Data items on the respective part patterns stored in the part pattern ROM 10 are read on the basis of the sex, part number, and part pattern number data items as the face characteristic data stored at present in the work RAM 9.

More specifically, data items on the patterns of parts stored in the part pattern ROM 10 are read on the basis of sex, part number and part pattern number data items. Data on a face image composed of a combination of the part patterns is stored in the VRAM 11, the contents of which data are displayed on the display 12. Thus, a face image based on the respective data items set initially in the work RAM 9 at step S10 is displayed on the display 12 at the time of the initial setting; a half-finished face image is displayed during formation of the face image; and a finished face image is displayed after the creation of the face image.

Thereafter, the step S14 is iterated to perform a required process on the basis of an interrupt signal from a respective one of the switches. Processes for selection of the respective patterns are all performed in the interrupt routines indicated below.

Figure 7:
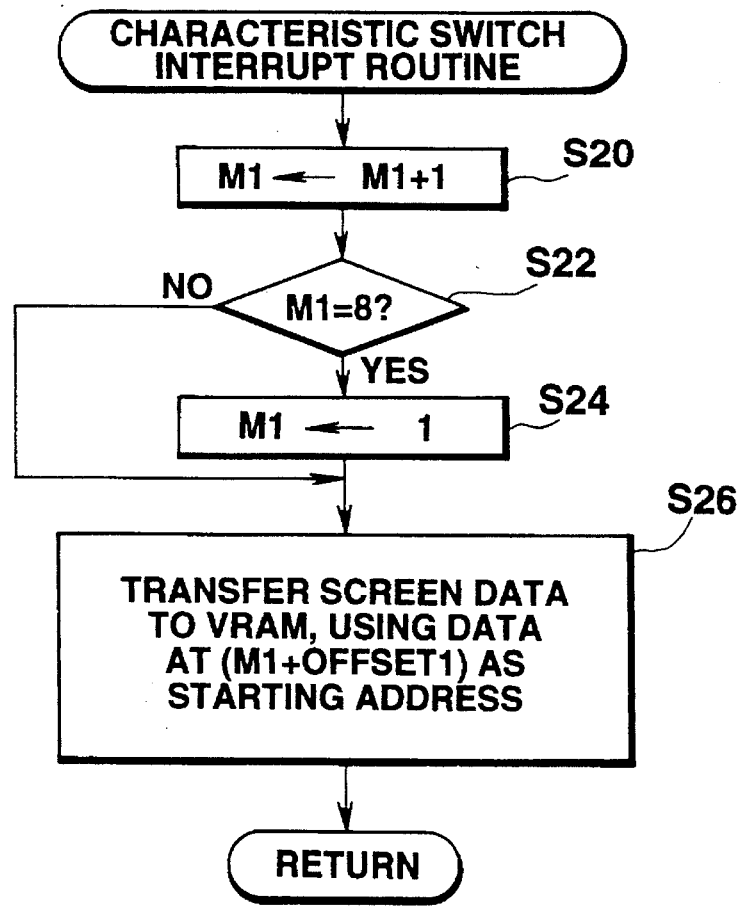
FIG. 7 is a flowchart indicative of a characteristic switch interrupt routine.

FIG. 7 is a flowchart indicative of a characteristic switch interrupt routine, which is executed each time the character switch 2 is operated. Each time the character switch 2 is operated, the contents of the screen data are changed sequentially as shown in FIGS. 5A–5D. The user selects face characteristic data items on a sex, hair style, eye, eyebrow, . . . , while viewing the screen of FIGS. 5A–5D.

When the characteristic switch 2 is first operated, the value of the pointer M1 register 15 is incremented by "1" at step S20. At step S22 it is determined whether the value of the register 15 is "8" which exceeds "7" which is the number of data items (on one sex, and six kinds of parts).

When it is determined at step S22 that the value of the pointer M1 register 15 is not equal to "8", control passes to step S26, where image data read from the screen data ROM 14, using as the starting address data at address (M1+OFFSET1) in the work RAM 9, is transferred to the VRAM 11.

When it is determined at step S22 that the current value of the pointer M1 register 15 is equal to "1", control passes to step S26, where screen data read from the work RAM 9, using as the start address data at address (M1+OFFSET1), is transferred to the VRAM 11. In this case, data at address (M1+OFFSET1) in the work RAM 9 is ADD1, and the contents of which are sex selection screen data, as shown in FIG. 4. Thus, a screen which urges the user to designate a sex in response to "sex ?" and "01: a male" and "02: a female" on the basis of the sex selection screen data is displayed on the display 12, as shown in FIG. 5A.

When the characteristic switch 2 is again operated, the value of the pointer M1 register 15 is "2" at step S20. Thus, since at step S22 it is determined that the current value of the register 18 is "2", at step screen data (used for the screen when a hair style is selected) corresponding to-address ADD2 of FIG. 4 is transferred to the VRAM 11. Thus, a display screen which urges the user to select a hair style in accordance with "hair style ?", "01: hair parted at 7:3", "02: shaved head", . . . on the basis of the screen data is displayed on the display 12, as shown in FIG. 5B.

Each time the characteristic switch 2 is operated sequentially, at step S20 the value of the register 15 is sequentially incremented. As a result, when it is determined at step S22 that the value of the register 15 is "8", control passes to step S24, where the value of the register 15 is returned to "1". Thereafter, control passes to step S26, where the screen data stored in the screen data ROM 14 is again transferred to the VRAM 11, using as the starting address data at address (M1+OFFSET1) in the work RAM 9. Thereafter, each time the characteristic switch 2 is operated, the value of the register 15 is incremented by one such that the screen data at (M1+OFFSET1) is transferred to the VRAM 9 to thereby display that screen data on the display 12.

In this way, each time the characteristic switch 2 is operated, the screen data is sequentially changed (FIGS. 5A–5D). As a result, the user sequentially selects sex data, data items on face characteristics such as hair style, eye, and eyebrow while viewing a selected screen changed sequentially.

Figure 8:
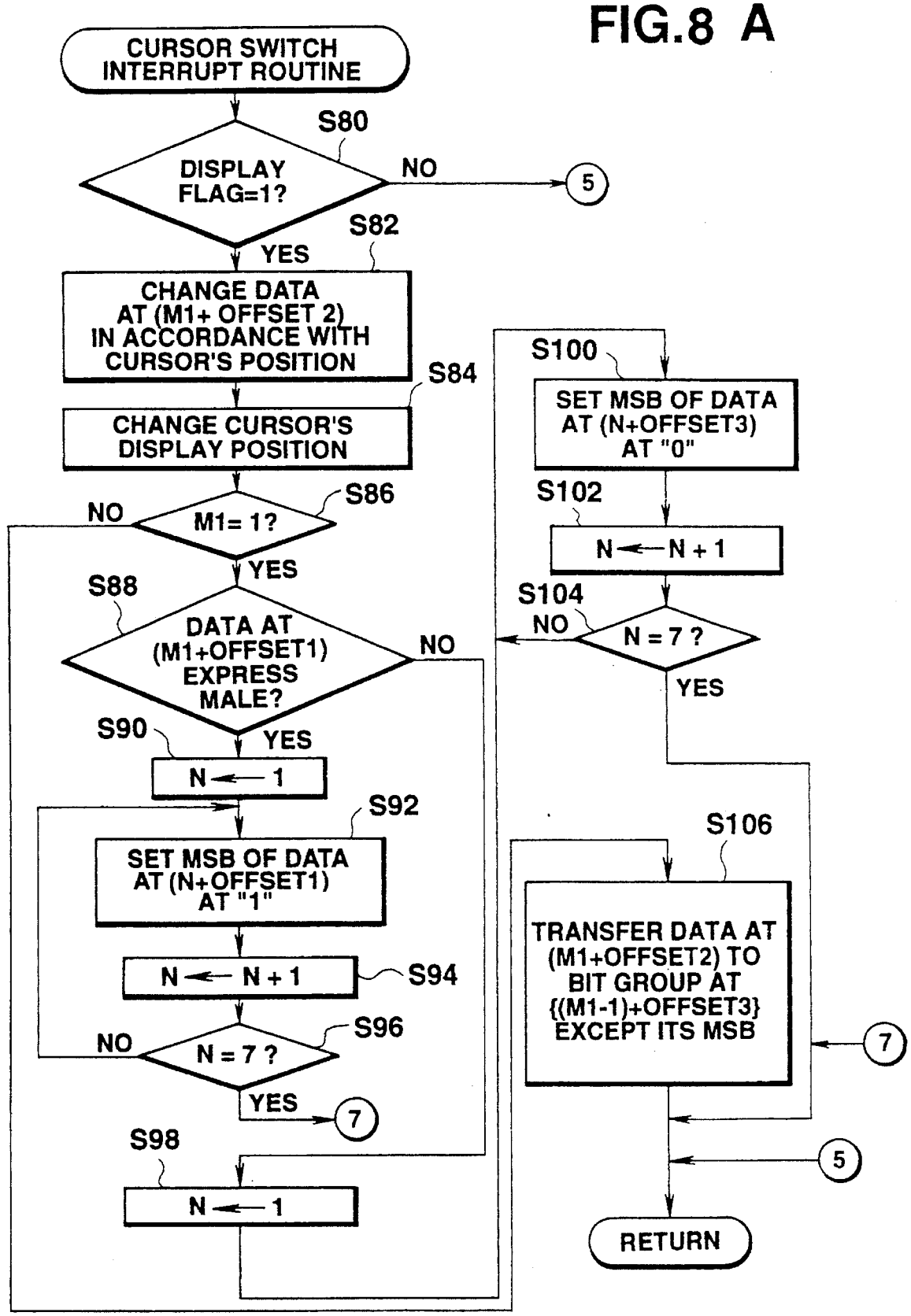
FIGS. 8A and 8B are flowcharts indicative of a cursor switch interrupt routine.
Figure 8:
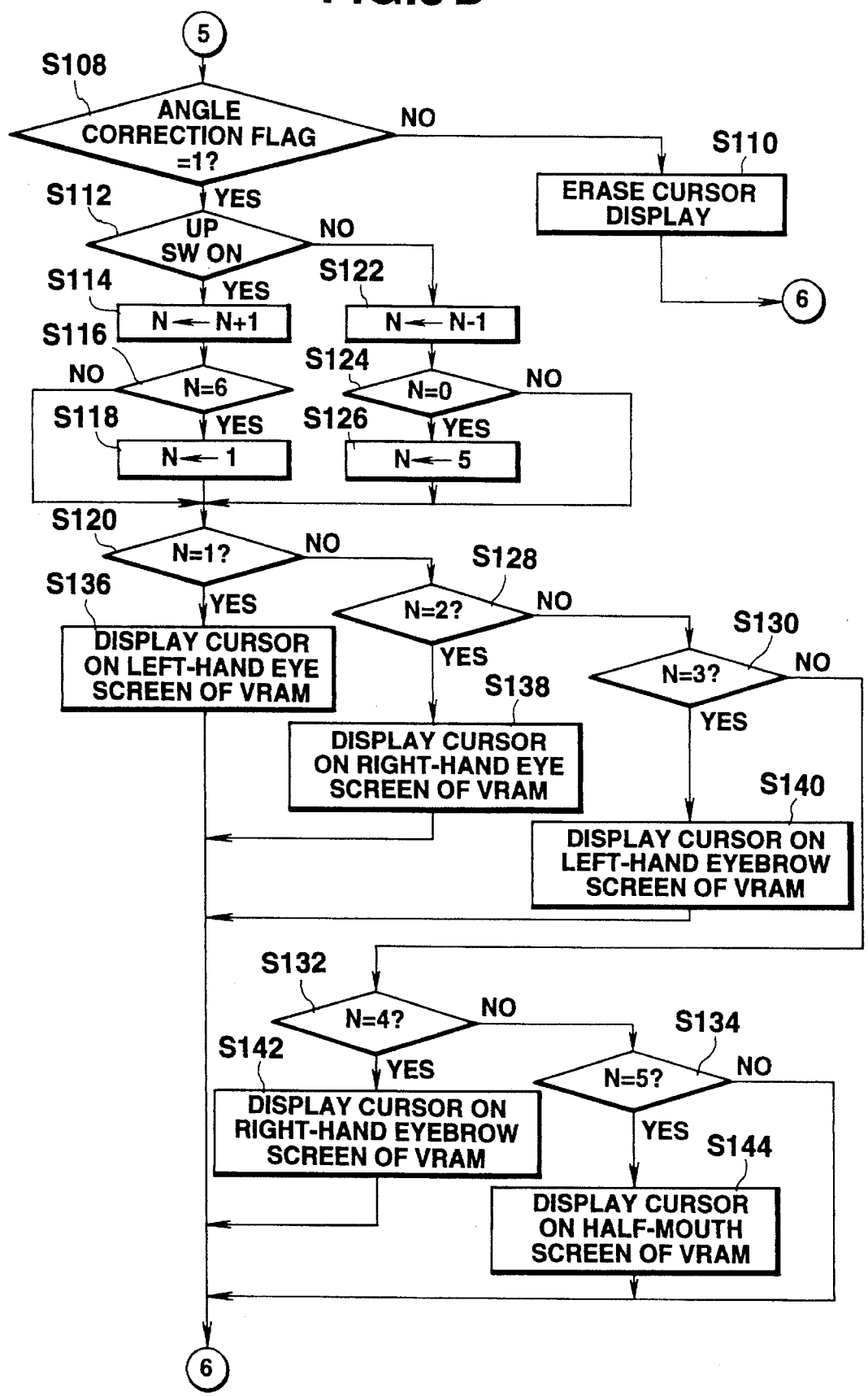

FIG. 8A is a flowchart indicative of a cursor switch interrupt routine. The cursor switch 3 is operated to select sex data, face characteristic data, etc., when a desired face image is created by a combination of desired part patterns. When the cursor switch 3 is operated, control passes to the cursor switch interrupt routine. First, at step S80 it is determined, for example, with the value of a display flag in the CPU 1 whether screen data which urges the user to select a sex or respective parts of FIGS. 5A–5D is now under display. This determination relates to whether some screen is displayed on the display 12. If no selected picture is displayed at present, it is unnecessary to display the position of the cursor K. When it is determined that no selected screen data is displayed, the current routine returns.

If it is determined that the selected picture data is under display when the cursor switch 3 is operated, control passes to the next step S82, where data items to select a sex and a part pattern number both set at present at address (M1+OFFSET2) in the work RAM 9 are changed in accordance with the position of the cursor K of the cursor switch 3 operated this time.

For example, when it is determined that M1=1, "sex" data stored at (OFFSET2+1) is changed in accordance with the position of the cursor K of the cursor switch 3 operated this time. Thus, if the position of the cursor K of the cursor switch 3 operated this time is changed from "02" to "01" in the state where "sex" selection screen of FIG. 5A is displayed, the sex data is changed to "01 (male)" in accordance with the position of the "01". If the position of the cursor K of the cursor switch 3 is changed from "01" to "02", the sex data is changed to "02 (female)" in accordance with the position of the "02".

When it is determined that M1=2, data (part pattern number) on the "hair style" stored at address (OFFSET2+2) is changed in accordance with the position of the cursor K of the cursor switch 3 operated this time. Thus, if the position of the cursor K of the cursor switch 3 operated this time is set at one of "01", "02", . . . in a state where "hair style selection screen" of FIG. 5B is displayed, data on a part pattern number stored at address (OFFSET2+2) is changed in accordance with that position to a part pattern number corresponding to the appropriate one of a "hair parted at 7:3" of hair style, "shaved head" of hair style, . . . .

At step S84 the displayed position of the cursor K on the display 12 is changed in accordance with the change of the data mentioned above.

At step S86 it is determined whether the value of the register 15 is "1" or it is determined whether the screen data is for determination of a sex. As a result, when M1="1" is determined, control passes to step S88, where it is determined whether data at address (OFFSET2+1) indicates a male.

If so, at step S90 the value of a pointer N is set at "1" in order to sequentially increment the value of the pointer from a location for a part "hair style" corresponding to address (OFFSET3+1) which stores address data indicative of face characteristic data to a location for another part.

At step S92 "1" indicative of a "male" is set at the position of the most significant bit (at a sex data location designated by a) of the face characteristic (hair style) data corresponding to an address (OFFSET3+1).

At step S94 the value of the pointer N is incremented to N=2. At step S96 it is then determined whether N=7 in order to set the MSB of the face characteristic data at "1" at up to the largest address (OFFSET3+6) in an area which stores address data indicative of the face characteristic data. Since N is not 7 now, control returns to step S92 to iterate a process similar to that just mentioned. Thus, Since N=2 now, the MSB of the data item at address (OFFSETS+2) is set at "1". Similarly, the MSBs of the respective data at addresses (OFFSET4+3), . . . (OFFESET4+8) are set at "1". When N=7 at step S96, the current cursor switch interrupt routine is terminated and control returns to the main program.

At step S88 when the determination is NO, or it is determined that the data at address (OFFSET3+M1) does not represent a male, but "02" which indicates a female, control passes to step S98, where the pointer N is set at "".

At step S100 the MSB of the data at address (OFFSET3+N) is set at "0". Since N="1" this time, first, the MSB of the data at address (OFFSET3+1) is set at "0". Then at step S102 the pointer N is incremented.

Thereafter, similarly, the MSBs of the respective data items at addresses (OFFSET3+3) to (OFFSET3+6) are sequentially set at "0".

When N=7 at step S104, the current cursor switch interrupt routine is terminated and control returns to the main program.

When at step S86 it is determined that the value of the register 15 is not "1", control passes to step S106, where the data at address (OFFSET2+M1) is transferred to a part pattern number location c where data on the part pattern number of FIG. 3B is stored in an area indicated by address ((OFFSET3+(M1−1)). Thus, data on a part pattern number corresponding to the data on the position of the cursor K designated by the cursor switch 3 is transferred to a part pattern number location c for the face characteristic data storage.

After step S106, the cursor switch interrupt routine is terminated and control returns to the main program.

When it is determined at step S80 that the result of determination of the display flag is not "1", control passes to a process of FIG. 8B and hence to its step S108 first, where it is determined whether the angle correction flag is "1". When the angle correction switch 6 is switched on, the flag becomes "1". At this time, the face image is displayed on the display 12 in this routine even when the display flag is "0". Unless the angle correction switch 6 is operated, the flag becomes "0". Thus, the face image is not displayed. This is because the angle of a part pattern of the face image cannot be corrected unless the face image is not displayed on the display 12.

When it is determined at step S108 whether the angle correction flag is "0" control passes to step S110, where the cursor display is erased, the current cursor switch interrupt routine is terminated, and control returns to the main program.

When the angle correction flag is determined to be "1" at step S108, it is determined that the angle correction switch 6 has been operated and control passes to step S112, where the result of the operation of the cursor switch 3 is determined. Since the cursor switch 3 is composed, for example, of a push button type up-down switch, the up switch is pressed when the cursor position is to be raised while the down switch is depressed when the cursor position is to be lowered.

If the up switch has been depressed, control passes to step S114, where the pointer N is incremented. Thus, in the next loop, N=2. At step S118 it is determined whether N=6 which exceeds the maximum value "5" in order to confirm whether all five numbers have been designated by the cursor to change the respective angles of five part patterns of the right- and left-hand eyes, right- and left-hand eyebrows and the mouth.

Unless N=6, control passes to step S120. If it is determined that N=6, control passes to step S118, where the value of the pointer N is returned to "1" and control passes to step S120. Thus, by depression of the upper switch of the angle correction switch 6 sequentially, the value of the pointer N is incremented by "1" to finally designate a desired part pattern.

Unless the up switch has been operated at step S112, it is determined that the down switch has been depressed and control passes to step S122, where the value of the pointer N is decremented. Thus, in the next loop, the value of the pointer N is decremented by "1". Then at step S124 it is determined whether N=0. If so, control passes to step S128, where the value of the pointer N is incremented to "5". Then control passes to step S120. Unless N=0, control jumps over step S128 to step S120. Thus, by sequential depression of the down switch of the cursor switch 3, the value of the pointer N is decremented by "1" to finally designate a desired part pattern.

At respective step S120, S128–S134 it is determined which of "1"–"5" the value of the pointer N is. When it is determined that the value of the pointer N is "1", control passes to step S138, where the cursor is displayed at the screen position of the part pattern of the left-hand eye on the VRAM 11. Thus, the cursor is displayed at the position of the pattern of the part "left-hand eye" on the display 12 in accordance with the operator's operation of the cursor switch 3. After step S136, the process in the current routine is terminated and control returns to the main program.

When it is determined that the value of the pointer N is "2", control passes to step S138, where the cursor is displayed at the screen position of the part pattern of the right-hand eye on the VRAM 11. Thus, the cursor is displayed at the screen position of the pattern of the part "right-hand eye" on the display 12 in accordance with the operator's operation of the cursor switch 3. After step S138, the process in the current routine is terminated and control returns to the main program.

When it is determined that the value of the pointer N is "3", control passes to step S140, where the cursor is displayed at the screen position of the part pattern of the left-hand eyebrow on the VRAM 11. Thus, the cursor is displayed at the screen position of the pattern of the part "left-hand eyebrow" on the display 12 in accordance with the operator's operation of the cursor switch 3. After step S140, the process in the current routine is terminated and control returns to the main program.

When it is determined that the value of the pointer N is "4", control passes to step S142, where the cursor is displayed at the screen position of the part pattern of the right-hand eyebrow on the VRAM 11. Thus, the cursor is displayed at the screen position of the pattern of the part "right-hand eyebrow" on the display 12 in accordance with the operator's operation of the cursor switch 3. After step S142, the process in the current routine is terminated and control returns to the main program.

When it is determined that the value of the pointer N is "5", control passes to step S144, where the cursor is displayed at the screen position of the part pattern of a half mouth on the VRAM 11. Thus, the cursor is displayed at the screen position of the pattern of the part "half mouth" on the display 12 in accordance with the operator's operation of the cursor switch 3. After step S144, the process in the current routine is terminated and control returns to the main program.

Figure 9:
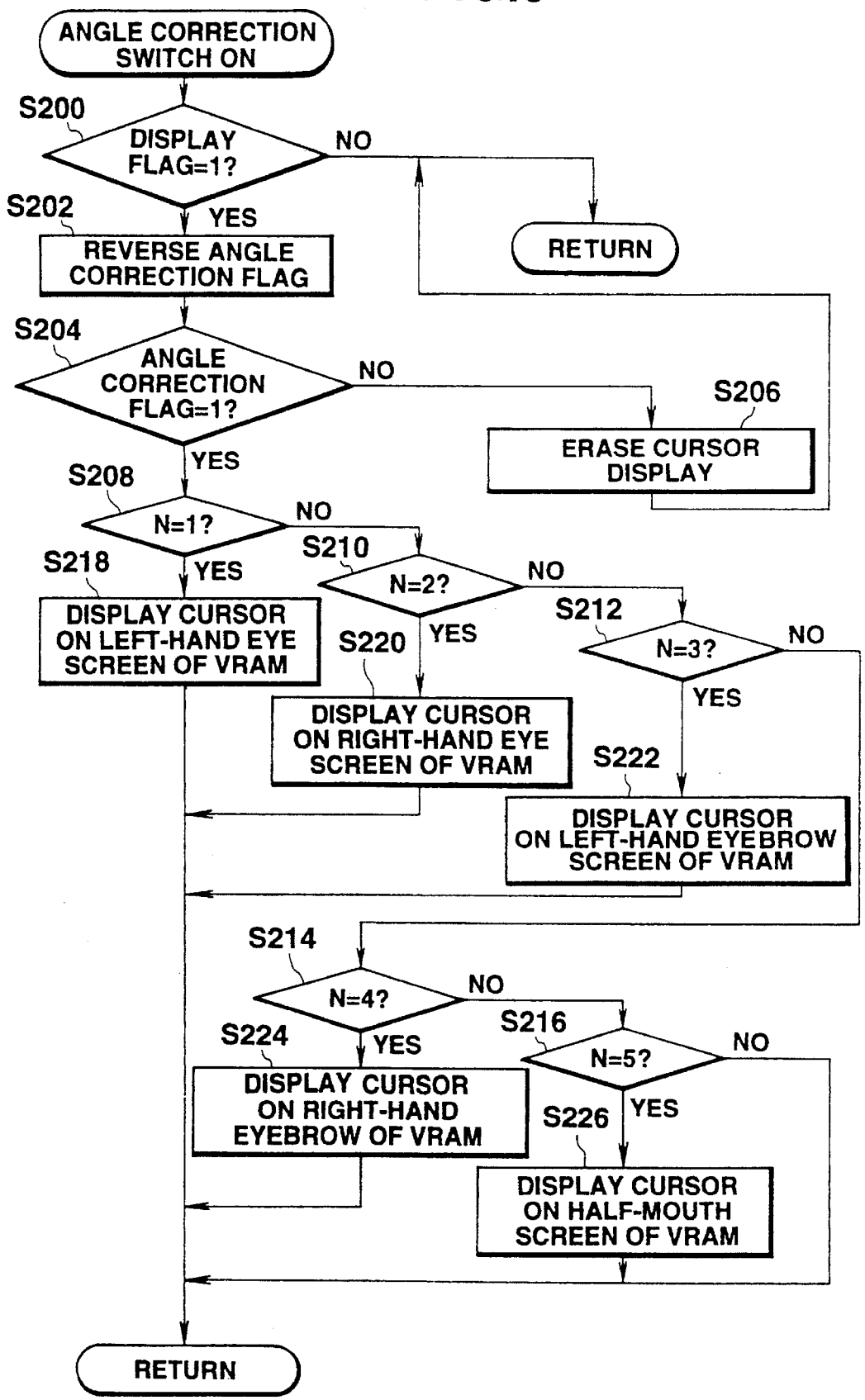
FIG. 9 is a flowchart indicative of an angle correction switch interrupt routine.

FIG. 9 is a flowchart indicative of an angle correction switch interrupt subroutine. When the angle correction switch 6 is operated, control passes to the angle correction switch interrupt routine. First, at step S200 of this routine the display flag is checked to determine whether a face image is displayed on the display 12. When it is determined that the image is displayed, the display flag becomes "1" because the part pattern of the face image is not displayed even when the angle correction switch 6 is operated unless the image is displayed on the display 12. When it is determined that the display flag is "0", the current routine is terminated and control returns to the main program.

When it is determined that the display flag is "1", control passes to step S202, where the angle correction flag is inverted. At step S204 it is determined whether the angle correction flag is "1". The angle correction flag is inverted each time the angle correction switch 6 is switched on when the face image is displayed on the display 12. When at step S204 it is determined that the angle correction flag is "0", control passes to step S206, where the cursor display on the screen is erased and control returns to the main program.

When it is determined at step S204 that the angle correction flag is "1", it is determined at respective steps S208–S216 which of "1"–"5" the value of the pointer N is. The position of the cursor is changed by execution of the cursor switch interrupt routine due to the operation of the cursor switch 3, as described above.

When it is determined that the value of the pointer N is "1", control passes to step S218, where the cursor is displayed at the screen position of the part pattern of the left-hand eye on the VRAM 11. Thus, the cursor is displayed at the screen position of the pattern of the part "left-hand eye" on the display 12 in accordance with the operator's operation of the cursor switch 3. Thereafter, a rotational angle switch interrupt routine is executed to correct the rotational angle of the left-hand eye. After step S218, the process in the current routine is terminated and control returns to the main program.

When it is determined that the value of the pointer N is "2", control passes to step S220, where the cursor is displayed at the screen position of the part pattern of the right-hand eye on the VRAM 11. Thus, the cursor is displayed at the screen position of the pattern of the part "right-hand eye" on the display 12 in accordance with the operator's operation of the cursor switch 3. Thereafter, the rotational angle switch interrupt routine is executed to correct the rotational angle of the left-hand eye. After step S220, the process in the current routine is terminated and control returns to the main program.

When it is determined that the value of the pointer N is "3", control passes to step S222, where the cursor is displayed at the screen position of the part pattern of the left-hand eyebrow on the VRAM 11. Thus, the cursor is displayed at the screen position of the pattern of the part "left-hand eyebrow" on the display 12 in accordance with the operator's operation of the cursor switch 3. Thereafter, the rotational angle switch interrupt routine is executed to correct the rotational angle of the left-hand eyebrow. After step S222, the process in the current routine is terminated and control returns to the main program.

When it is determined that the value of the pointer N is "4", control passes to step S224, where the cursor is displayed at the screen position of the part pattern of the right-hand eyebrow on the VRAM 11. Thus, the cursor is displayed at the position of the pattern of the part "right-hand eyebrow" on the display 12 in accordance with the operator's operation of the cursor switch 3. Thereafter, the rotational angle switch interrupt routine is executed to correct the rotational angle of the right-hand eyebrow. After step S224, the process in the current routine is terminated and control returns to the main program.

When it is determined that the value of the pointer N is "5", control passes to step S226, where the cursor is displayed at the screen position of the part pattern of a half mouth on the VRAM 11. Thus, the cursor is displayed at the position of the pattern of the part "half mouth" on the display 12 in accordance with the operator's operation of the cursor switch 3. Thereafter, the rotational angle switch interrupt routine is executed to correct the rotational angle of the half mouth. After step S226, the process in the current routine is terminated and control returns to the main program.

Figure 10:
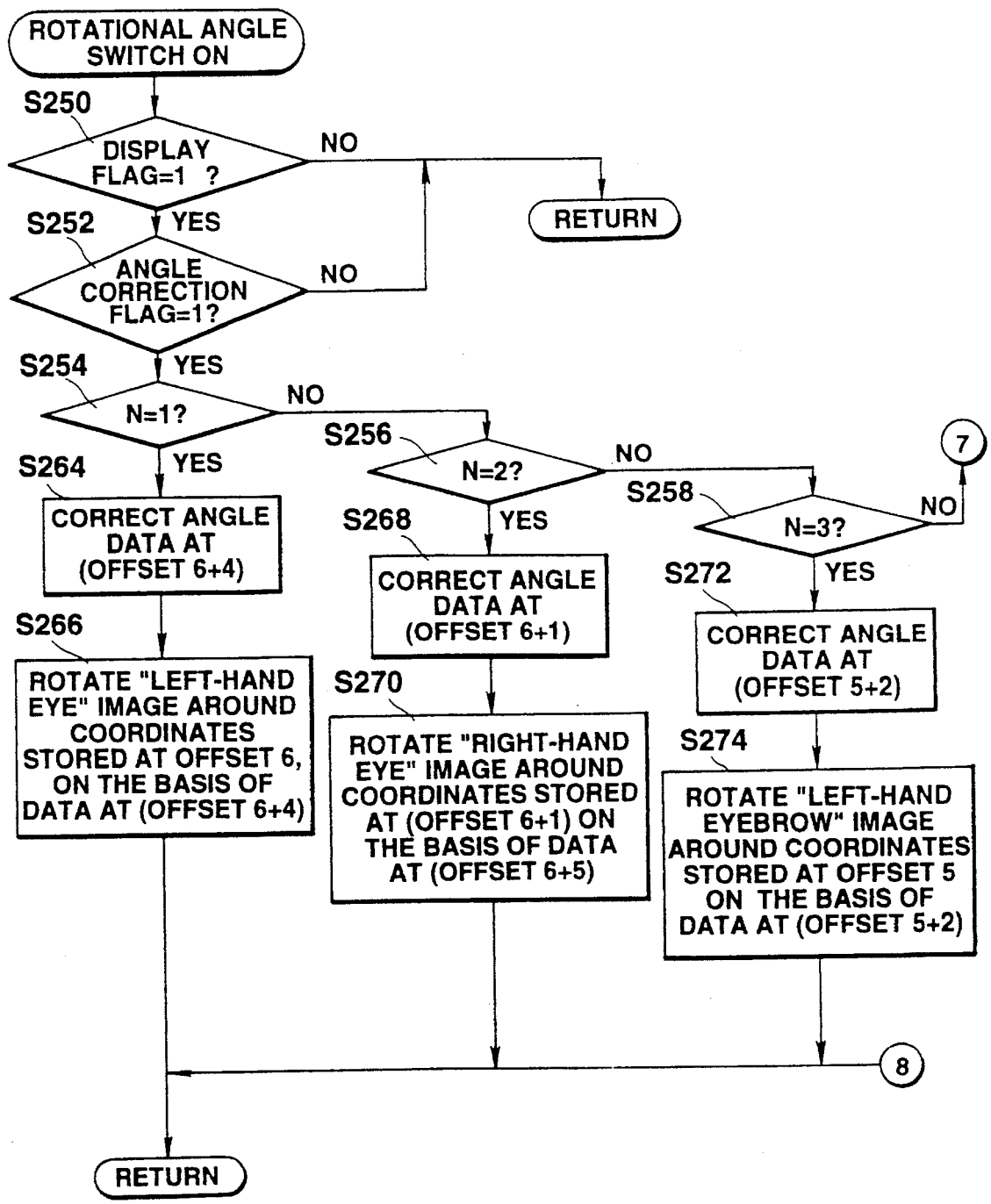
FIGS. 10A and 10B are flowcharts indicative of a rotational angle switch interrupt routine.
Figure 10:
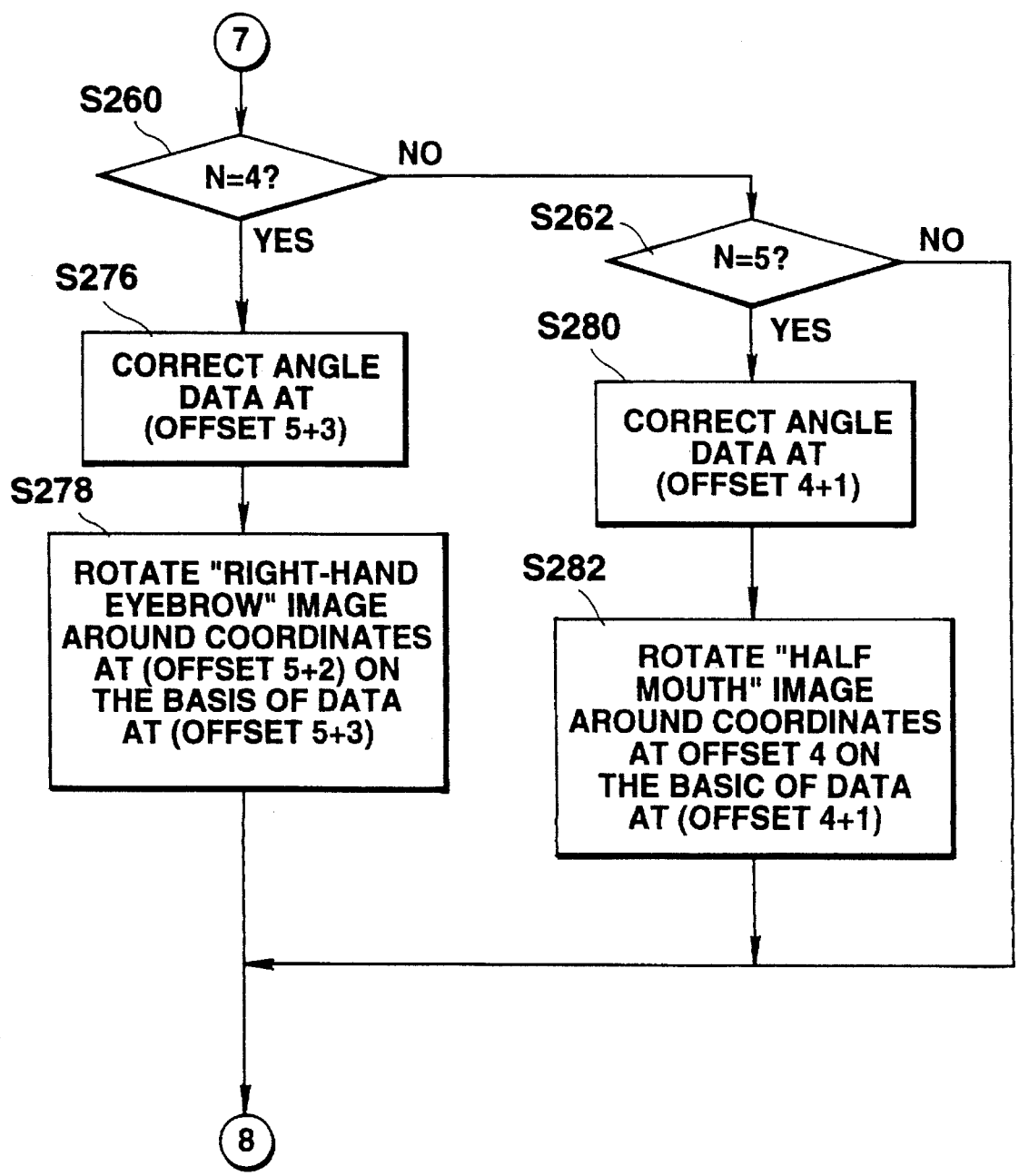

FIGS. 10A and 10B are a flowchart indicative of the rotational angle switch interrupt subroutine. When the rotational angle switch 6 is operated, control passes to the rotational angle switch interrupt routine. First, at step S250 it is checked whether the display flag is "1" to determine whether a face image is displayed on the display 12. When the image is displayed on the display 12, the display flag becomes "1". If the image is not displayed on the display 12, the rotational angle of the part pattern cannot be changed even when the rotational angle switch 1 is operated. When it is determined that the display flag is "0", the current routine is terminated and control returns to the main program.

When it is determined that the display flag is "1", control passes to step S252, where it is determined whether the angle correction flag is "1". When it is determined that the angle correction flag is "0", the current routine is similarly terminated and control returns to the main program. When it is determined that the angle correction flag is "1", it is determined at steps S254–S262 which of "1"–"5" the value of the pointer N is. The position of the cursor is changed by execution of the cursor switch interrupt routine due to the operation of the cursor switch 3, as described above.

When it is determined that the value of the pointer N is "1", control passes to step S264, where data on the angle stored at address (OFFSET6+4) is corrected. Since data on the rotational angle of the pattern of the part "left-hand eye" is stored at address (OFFSET6+4), the current operation of the rotational angle switch 7 corrects the data to data on a new rotational angle (for example, data on an increased rotational angle of the part pattern of the part "left-hand eye"). At step S266 the image "left-hand eye" is rotated around coordinates (of the rotational position of the left-hand eye), data on which is stored at OFFSET6, on the basis of angle data stored at address (OFFSET6+4). Thus, the part pattern of the left-hand eye is rotated by a new rotational angle due to the current operation of the rotational angle switch 7, and displayed. After step S266, the current routine is terminated and control returns to the main program.

When it is determined that the value of the pointer N is "2", control passes to step S268, where the angle data stored at (OFFSET6+5) is corrected. Since data on a duplication ankle or data on a rotational angle of the right-hand eye including data on a duplication of the rotational angle of the left-hand eye is stored at address (OFFSET6+5), it is corrected by the current operation of the rotational angle switch 7 to data on a new rotational ankle (for example, data on an increased rotational angle of the part pattern of the right-hand eye). At step S270 the "right-hand" image is rotated on the basis of a duplication angle, data on which is stored at (OFFSET6+5), around the duplication coordinates, i.e., the rotational position of the right-hand eye which is a duplication of the rotational position of the left-hand eye, data on which is stored at (OFFSET6+1). Thus, the part pattern of the right-hand eye is rotated through the new rotational angle by the current operation of the rotational angle switch 7 and displayed. After step S270, the process in the current routine is terminated and control returns to the main program.

When it is determined that the value of the pointer N is "3", control passes to step S272, where the data on the angle stored at (OFFSET5+2) is corrected. Since data on the rotational angle of the left-hand eyebrow is stored at address (OFFSET6+2), it is corrected by the current operation of the rotational angle switch 7 to data on a new rotational angle (for example, data on an increased rotational angle of the part pattern of the left-hand eyebrow). At step S274 the "left-hand eyebrow" image is rotated on the basis of angle data stored at (OFFSET5+2) around the coordinates of the rotational position of the left-hand eyebrow, data on which is stored at OFFSET5. Thus, the part pattern of the left-hand eyebrow is rotated through the new rotational angle by the current operation of the rotational angle switch. V and displayed. After step S274, the process in the current routine is terminated and control returns to the main program.

A process of FIG. 10B is then performed. When it is determined that the value of the pointer N is "4", control passes to step S278, data on an angle stored at (OFFSET5+3) is corrected. Since data on a duplication angle or data on a rotational angle of a part pattern of the right-hand eyebrow including data on a duplication of the rotational angle of the part pattern of the left-hand eyebrow is stored at address (OFFSET5+3), it is corrected by the current operation of the rotational angle switch 7 to data on a new rotational angle (for example, data on an increased rotational angle of the part pattern of the right-hand eyebrow). At step S278 the "right-hand eyebrow" image is rotated on the basis of a duplication angle, data on which is stored at (OFFSET5+3) around duplication coordinates (i.e., the rotational position of the right-hand eyebrow which is a duplication of the rotational position of the left-hand eyebrow), data on which is stored at (OFFSET5+2). Thus, the part pattern of the right-hand eyebrow is rotated through the new rotational angle by the current operation of the rotational angle switch 7 and displayed. After step S278, the process in the current routine is terminated and control returns to the main program.

When it is determined that the value of the pointer N is "5", control passes to step S280, where the data on the angle stored at (OFFSET4+1) is corrected. Since data on the rotational angle of the part pattern of the half mouth is stored at address (OFFSET4+1), it is corrected by the current operation of the rotational angle switch 7 to data on a new rotational angle (for example, data on an increased rotational angle of the part pattern of the half mouth). At step S282 the "half mouth" image is rotated on the basis of the angle data stored at (OFFSET4+1) around coordinates of the rotational position of the half mouth, data on which is stored at OFFSET4. Thus, the part pattern of the half mouth is rotated through the new rotational angle by the current operation of the rotational angle switch 7 and displayed. After step S282, the process in the current routine is terminated and control returns to the main program.

Figure 11:
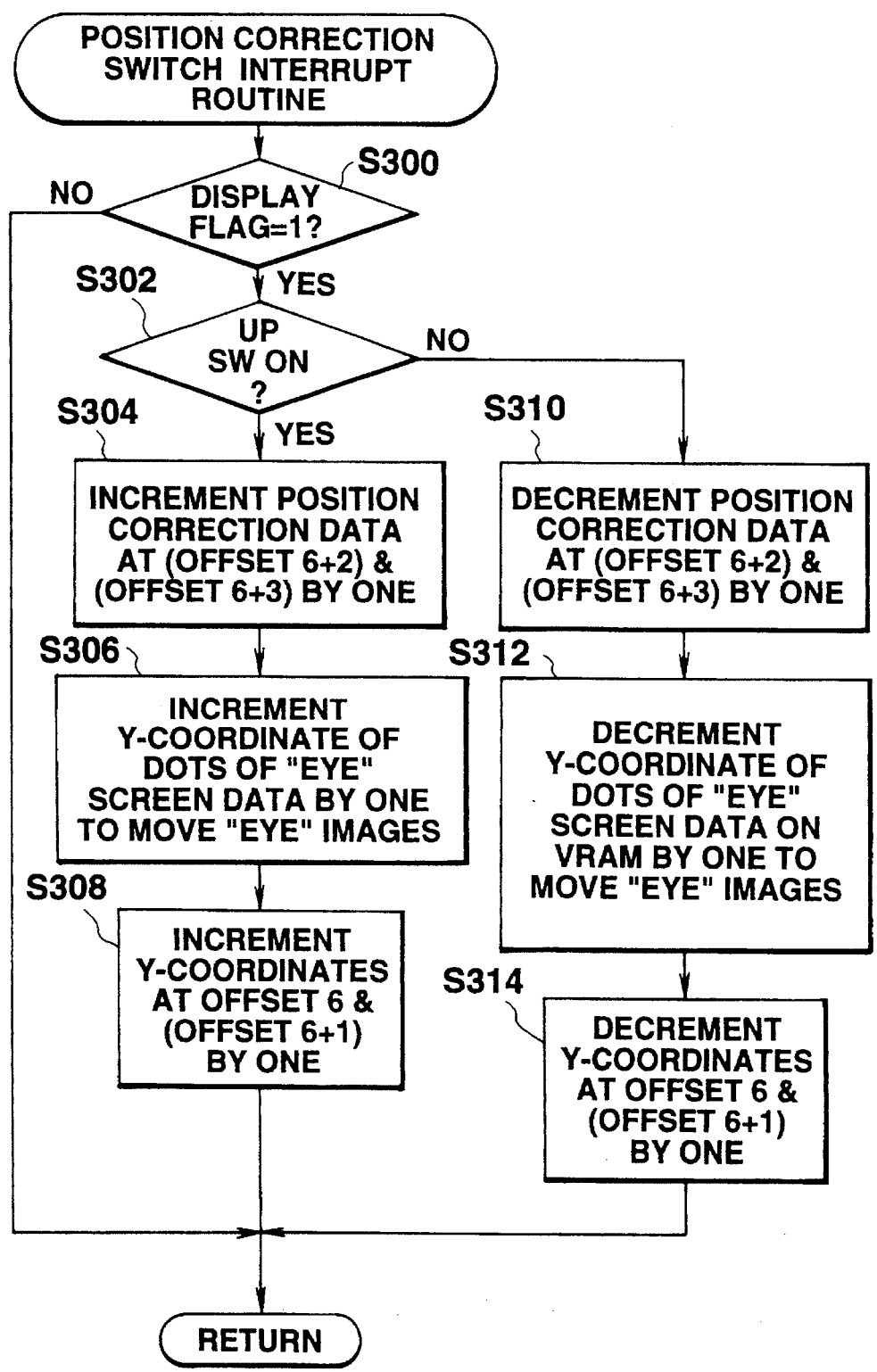
FIG. 11 is a flowchart indicative of a position correction switch interrupt routine.

FIG. 11 is a flowchart indicative of the position correction switch interrupt subroutine. When the position correction switch 5 is operated, control passes to the position correction switch interrupt routine. First, at step S300 it is checked whether the display flag is "1" to determine whether a face image is displayed on the display 12. When it is determined that the image is displayed on the display 12, the display flag becomes "1". Unless the image is displayed on the display 12, the position of a part pattern of the face image cannot be corrected even when the position correction switch 5 is operated. When it is determined that the display flag is "0", the current routine is terminated and control returns to the main program.

When it is determined that the display flag is "1", control passes to step S302, where it is determined whether the up switch of the position correction switch 5 is on. The position correction switch 5 is operated to correct the position of a part pattern, especially an eye pattern, of the face image and is composed of a push button type up-down switch. In this embodiment, it is determined whether the up switch has been depressed. When the up switch is on, control passes to step S304, where data items on the position correction at addresses (OFFSET6+2) and (OFFSET6+3) are incremented by "1". Since data on the position correction (for correction of the position of the left-hand eye) is stored at address (OFFSET6+2) and data on a duplication correction position (i.e., a corrected position of the right-hand eye including a duplication of a corrected position of the left-hand eye)is stored at address (OFFSET6+3). Thus, at step S304 both data items on the corrected position of the left- and right-hand eyes are incremented by "1".

At step S306 the y-coordinate of dots which compose data on the "eye" image on the VRAM 11 is incremented by "1" to move the position of the right- and left-hand eyes. Thus, the right- and left-hand eyes are displayed at raised (y-coordinate) positions on the display 12. At step S308 the y-coordinates of the position coordinates, data on which is stored at addresses OFFSET6 and (OFFSET6+1), are incremented by "1" and control then returns to the main program. Data on the coordinates (of the rotational position of the left-hand eye) is stored at address OFFSET6 and data on the duplication coordinates (i.e., the rotational position of the right-hand eye including a duplication of the rotational position of the left-hand eye) is stored at address (OFFSET6+1). Thus, at step S308 both the y-coordinates of the rotational positions of the right- and left-hand eyes are incremented by "1".

When the up switch is not on (or when the down switch is on), control passes to step S310, where data items on position correction at addresses (OFFSET6+2) and (OFFSET6+3) are decremented by "1". Data on position correction (i.e., correction of the position of left-hand eye) is stored at address (OFFSET6+2) and data on a duplication correction position (i.e., a corrected position of the right-hand eye including a duplication of the corrected position of the left-hand eye) is stored at address (OFFSET6+3). Thus, at step S310 both data items on the corrected positions of the right- and left-hand eyes are decremented by "1". At step S312 the y-coordinate of dots which compose data on the "eye" image on the VRAM 11 is decremented by "1" to move the positions of the right- and left-hand eyes. Thus, the right- and left-hand eyes are displayed at a lowered (y-coordinate) position on the display 12. At step S314 the y-coordinate of the position coordinates, data items on which are stored at addresses OFFSET6 and (OFFSET6+1), is decremented by "1" and control then returns to the main program. Data on the coordinates (of the rotational position of left-hand eye) is stored at address OFFSET6, and data on the duplication coordinates (of the rotational position of the right-hand eye including a duplication of the rotational position of the left-hand eye) is stored at address (OFFSET6+1). Thus, at step S314 both the y-coordinates of the rotational positions of the right- and left-hand eyes are decremented by "1".

Figure 12:
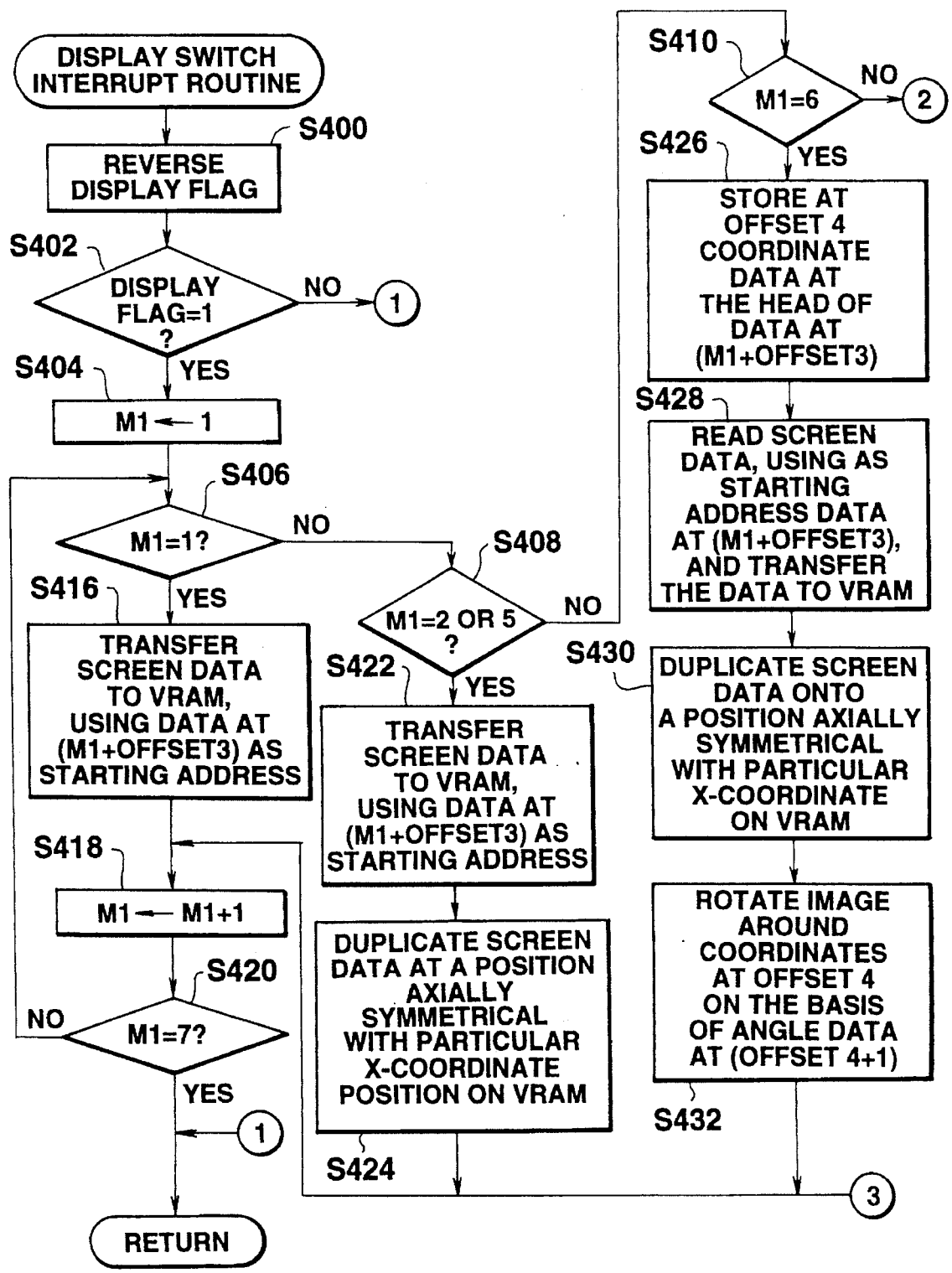
FIGS. 12A–12C are flowcharts indicative of a display switch interrupt routine.

FIG. 12A is a flowchart indicative of a display switch interrupt routine. When the display switch 4 is operated to display a face image or a selected screen on the display 12, the display switch interrupt routine starts.

In this case, first at step S400, the display flag is inverted, which occurs each time the display switch is operated.

At step S402 it is determined whether the display flag is "1". If it is determined that the display flag is "0", control passes to the main program.

When the display switch 4 is operated and the display flag becomes "1", control branches to step S404, where the value of the pointer M1 is returned to "1". The values of the pointer M1 correspond to parts of the face as follows. For example, M1=1 corresponds to a hair style; M1=2 corresponds to a half contour; M1=3 corresponds to an eye, and so on. Thus, the reason why the value of the pointer M1 is returned to "1" at step S404 is that, first, the characteristic of a hair style is determined, and data on the characteristics (for example, data on a corrected position correction, data on the rotational angle) of part patterns corresponding to the state of manipulation of the operator is read and displayed on the display 12.

At respective steps S406–S414 it is determined whether the value of the pointer M1 is "1", "2", "5", "6", "3" or "4".

When it is determined that the value of the pointer M1 is "1", M1="1" designates data on the characteristics of a hair style. At this time, control passes to step S418, where data on a part pattern for "hair style" corresponding to face characteristic data for "hair style" as the screen data is read from the part pattern ROM 10, using as the starting address data at address (M1+OFFSET3), is transferred to the VRAM 11. Thus, at step S418 the part pattern for "hair style" is displayed on the display 12.

When at step S408 it is determined that the value of M1 is different from "1", control passes to step S408. When at step S420 it is determined that the value of M1 is "7", the current routine is terminated and control returns to the main program.

Figure 13:
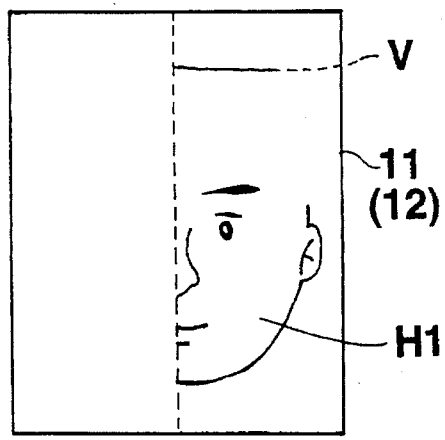
FIGS. 13A–13D each illustrate a created face image.
Figure 13:
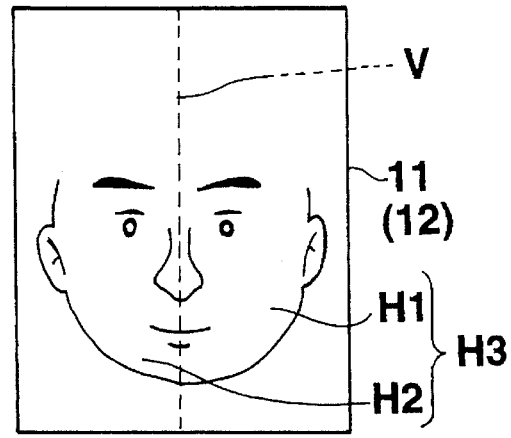
Figure 13:
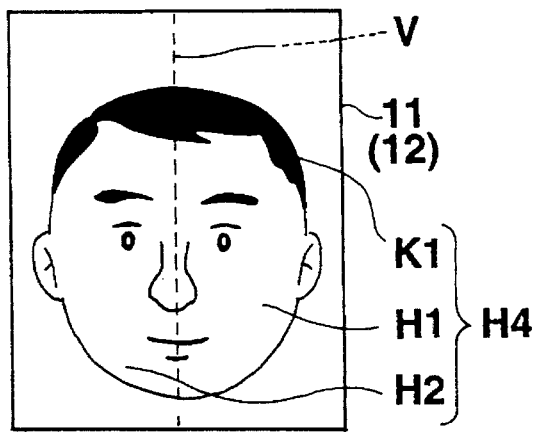
Figure 13:
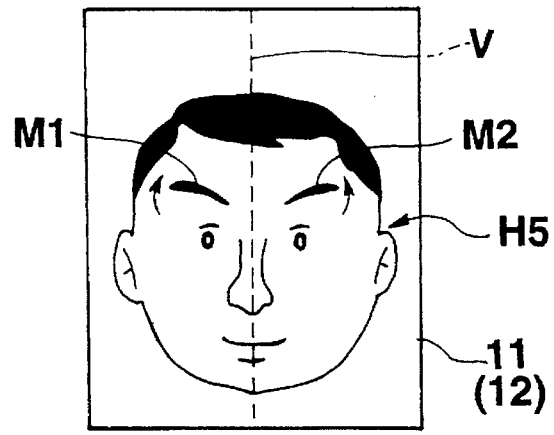

When it is determined that the value of M1 is or "5", M1=2 designates data on the characteristic of a "half contour", and M1=5 designates data on the characteristic of a "half nose". At this time, control passes to step S422, where data on the part pattern of a "half contour" or "half nose" on the left-hand half of the face image corresponding to face characteristic data for "half contour" or "half nose" which is the contents of the screen data is read from the part pattern ROM 10, using as the starting address data at address (M1+OFFSET3), and is transferred to the VRAM 11. Thus, the patterns of the parts "half contour" or "half nose" as the features of the face on its left-hand half are displayed on the display 12 (FIG. 13A).

At step S424 the image data is then duplicated onto a position on the VRAM 11 axially symmetrical with the position of a particular x-coordinate on the VRAM 11. Control then passes to step S418. Thus, the patterns of the parts "half contour", "half nose" on the right-hand half of the face image corresponding to the characteristics (contour or nose) of the face image are duplicated. Thus, the part patterns of the "half contour" or "half nose" on the right-hand half of the face are stored at the corresponding x-coordinate position on the VRAM 11. Thus, the part patterns on the right-hand half of the face and the corresponding ones on the left-hand half of the face, data on which part patterns is already stored at the x-coordinate position of the "half contour" or "half nose" part pattern, are combined and the resulting whole part pattern is then displayed on the display 12 (FIG. 13B).

When it is determined that the value of the pointer M1 is "6", M1=6 designates data on the characteristic of a "half mouth". At this time, control passes to step S428, where the coordinate data at the head of data stored at address (M1+OFFSET3) is stored at address OFFSET4. At this time, data on address (M1+OFFSET3) in the work RAM 9 is address data for designation of data on a face characteristic. When it is determined that M1="6", this is address data for designation of data on a characteristic of the half mouth. Thus, data on the coordinates of the left-hand half mouth is stored as data on the coordinates of the rotational center of the left-hand half mouth at address OFFSET4 in the work RAM 9.

At step S428 image data is read, using data stored at address (M1+OFFSET3) as the starting address, and is transferred to the VRAM 11. Thus, the left-hand half of the pattern of the part "mouth" as the characteristic of the face on its left-hand half is displayed on the display 12.

At step S430 the screen data is then duplicated at a position on the VRAM 11 axially symmetrical with the position of a particular x-coordinate on the VRAM 11. Thus, the left-half of the part pattern of the "mouth" corresponding to the "mouth" of the face image its characteristic is duplicated. Thus, the right-hand half of the pattern of the part "mouth" is stored at the x-coordinate position of the pattern of the part "half mouth" on the VRAM 11. Thus, the right-hand half part pattern of the mouth and the corresponding left-hand half of the mouth, data on which part pattern is already stored at the x-coordinate position, are combined and the resulting whole part pattern is then displayed on the display 12 (FIG. 13B). At step S432 the image is rotated around the coordinates, data on which is stored at address OFFSET4, on the basis of data on the angle, data on which is stored at address (OFFSET4+1). At this time, data on the coordinates of the position of the rotational center of the "half mouth pattern" is stored at address OFFSET4. Data on an angle through which the "half mouth" pattern is rotated is stored at address (OFFSET4+1). Thus, the part pattern of the "mouth" is rotated around the coordinates, data on which stored at address OFFSET4, by the rotational angle, data on which is stored at address (OFFSET4+1), and the resulting mouth image is displayed on the display 12. After step S432, control passes to step S418.

Figure 12B:
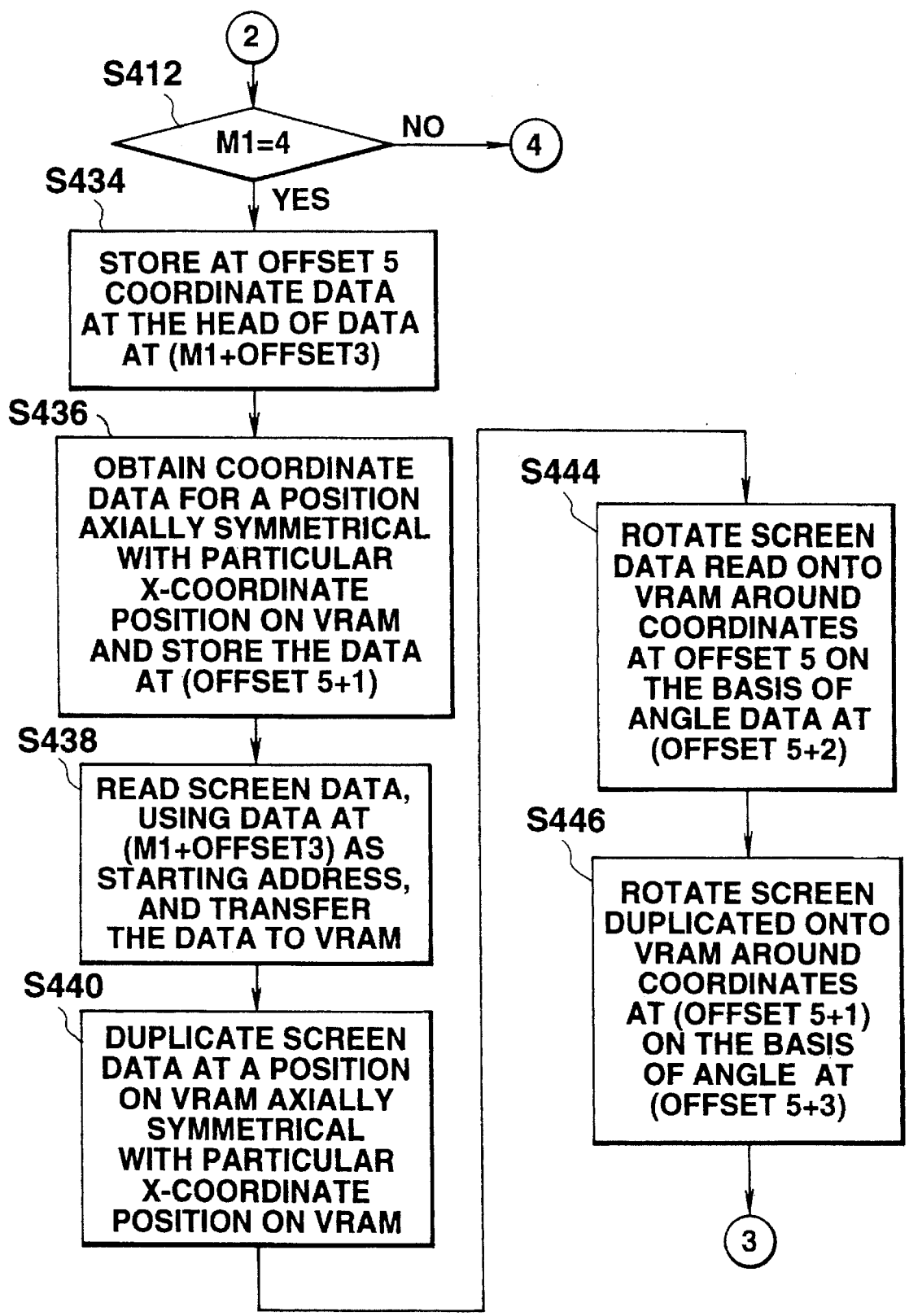

When it is determined that the value of the pointer M1 is "4", a process of FIG. 12B is performed. M1=4 designates data on the characteristic of an "eyebrow". At this time, control passes to step S434, where the coordinate data at the head of data stored at address (M1+OFFSET3) is stored at address OFFSET5. At this time, data at address (M1+OFFSET3) in the work RAM 9 is address data for designation of data on the characteristics of the face image. When it is determined that M1="4", this is address data for designation of data on a characteristic of the eyebrow. Thus, data on the coordinates of the left-hand eyebrow is stored as data on the coordinates of the rotational center of the left-hand eyebrow at address OFFSET5 in the work RAM 9.

At step S436 data on the coordinates of a position on the VRAM 11 axially symmetrical with the position of a particular x-coordinate on the VRAM 11 is obtained and stored at address (OFFSET5+1). Thus, data on the coordinates of the rotational center of the right-hand eyebrow corresponding to the same y-coordinate position as the rotational center of the left-hand eyebrow is stored.

At step S438 screen data is read, using data at address (M1+OFFSET3) as the starting address, and transferred to the VRAM 11. Thus, data on the pattern of the left-hand eyebrow corresponding to the "eyebrows" as the characteristic of the face image is read from the part pattern ROM 10 and displayed on the display 12. At step S440 the screen data is then duplicated onto a position on the VRAM 11 axially symmetrical with a particular x-coordinate position on the VRAM 11. Thus, the part pattern of the left-hand eyebrow as the characteristic of the face image is duplicated to be a right-hand eyebrow, the part pattern of which is displayed on the display 12. After all, both the right- and left-hand eyebrows are displayed.

At step S444 the screen data read onto the VRAM 11 is rotated around the coordinates, data on which is stored at address OFFSET5 on the basis of data on the angle at address (OFFSET5+2). At this time, data on the coordinates (of the position of the rotational center of the left-hand eyebrow) is stored at address OFFSET5. Data on an angle through which the left-hand eyebrow pattern is rotated is stored at address (OFFSET5+2). Thus, the part pattern of the left-hand eyebrow is rotated around the coordinates, data on which stored at address OFFSET5, by the rotational angle, data on which is stored at address (OFFSET5+2) and the resulting eyebrow pattern is displayed on the display 12.

At step S448 the screen data duplicated onto the VRAM 11 is rotated around the coordinates, data on which is stored at address (OFFSET6+1) on the basis of data the angle at address (OFFSET5+3). At this time, duplicated data on the coordinates (of the position of the rotational center of the right-hand eyebrow) is stored at address (OFFSET6+1). Duplicated data on an angle through which the right-hand eyebrow pattern is rotated is stored at address (OFFSET5+3). Thus, the part pattern of the right-hand eyebrow is rotated around the coordinates, the data on which is stored at address (OFFSET6+1), by the rotational angle, data on which is stored at address (OFFSET5+3) and the resulting eyebrow pattern is displayed on the display 12. After step S448, control passes to step S418.

Figure 12C:
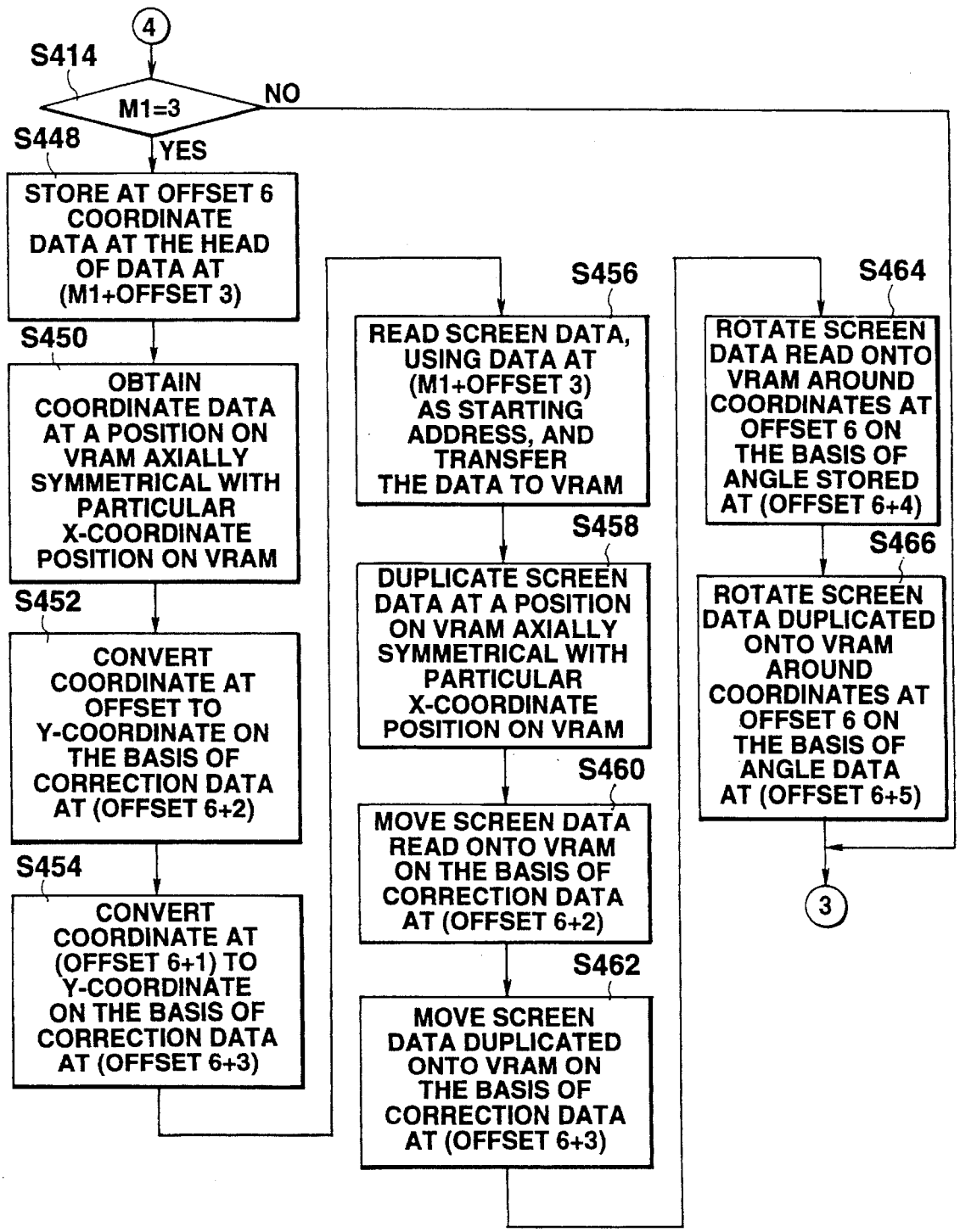

When it is determined that the value of the pointer M1 is "3", a process of FIG. 12C is performed. M1=3 designates data on the characteristic of an "eye". At this time, control passes to step S448, where the coordinate data at the head of data stored address (M1+OFFSET3) is stored at address OFFSET6. At this time, data at address (M1+OFFSET3) in the work RAM 9 is address data for storage of data on the characteristics of the face image. When it is determined that M1="3", it is address data for designation of the characteristic data of the eyes. Thus, data on the coordinates of the left-hand eye is stored as data on the coordinates of the rotational center of the left-hand eye at address OFFSET6 in the work RAM 9.

At step S450 data on the coordinates of a position on the VRAM 11 axially symmetrical with a particular x-coordinate position on the VRAM 11 is obtained and stored at address (OFFSET6+1). Thus, data on the coordinates of the rotational center of the right-hand eye corresponding to the same y-coordinate position as the rotational center of the left-hand eye is stored.

At step S452 data on the coordinates at address OFFSET6 is converted to a y-coordinate on the basis of correction data at address (OFFSET6+2). Data on the coordinates at address OFFSET8 represents the center of rotation of the left-hand eye. Data on position correction at address (OFFSET6+2) is for correction of the position of the left-hand eye. Thus, the position of the part pattern of the left-hand eye is adjusted upward or downward (in the y-coordinate change direction) by the correction data at address (OFFSET6+2) with respect to a first position represented by the coordinates, data on which is stored at OFFSET6, and displayed.

At step S454 data on the coordinates at address (OFFSET6+1) is converted to data on a y-coordinate on the basis of the correction data at address (OFFSET6+3). Data on the coordinates at address (OFFSET6+1) is duplication data on the coordinate of the center of rotation of the right-hand eye. Data at address (OFFSET6+3) is duplication position correction data for correction of the position of the right-hand eye. Thus, the position of the part pattern of the right-hand eye is adjusted upward or downward (in the y-coordinate change direction) by the duplication position correction data at address (OFFSET6+3) with respect to a first position represented by the coordinate data at address (OFFSET6+1), and displayed.

At step S456 screen data is read, using data at address (M1+OFFSET3) as the starting address, and transferred to the VRAM 11. Thus, a part pattern for the left-hand eye as one of the characteristics of the face image is displayed on the display 12. At step S458 the screen data is then duplicated onto a position on the VRAM 11 axially symmetrical with a particular x-coordinate position on the VRAM 11. Thus, the pattern of the left-hand eye as the characteristic of the face image is duplicated to be a pattern of a right-hand eye, which is then displayed on the display 12. After all, the right- and left-eyes are displayed as a unit.

At step S460 the image read onto the VRAM 11 is moved to a position based on the position correction data at address (OFFSET6+2). Thus, the position of the left-hand eye is moved by an amount corresponding to the position correction data at address (OFFSET6+2) and displayed.

At step S462 the image duplicated onto the VRAM 11 is moved on the basis of the duplication position correction data at address (OFFSET6+3). Thus, the position of the right-hand eye is moved by an amount corresponding to the duplication position correction data at address (OFFSET6+3), and displayed.

At step S464 the screen data read onto the VRAM 11 is rotated around the coordinates, data on which is stored at address OFFSET6, on the basis of data on an angle at address (OFFSET6+4). At this time, data on the coordinates of the position of the rotational center of the left-hand eye pattern is stored at address OFFSET6. Data on an angle through which the left-hand eye pattern is rotated is stored at address (OFFSET6+4). Thus, the part pattern of the left-hand eye is rotated around the coordinates, data on which stored at address OFFSET6, by the rotational angle, data on which is stored at address (OFFSET6+4), and the resulting rotated eye pattern is displayed.

At step S488 the screen, data on which is duplicated onto the VRAM 11, is rotated around the coordinates, data on which is stored at address (OFFSET6+1), on the basis of the angle data at address (OFFSET6+5). At this time, duplicated data on the coordinates of the position of the rotational center of the right-hand eye pattern is stored at address (OFFSET6+1). Duplication data on an angle through which the right-hand eye pattern is rotated is stored at address (OFFSET6+5). Thus, the part pattern of the right-hand eye is rotated around the duplication coordinates, the data on which stored at address (OFFSET6+1), by the duplicated rotational angle, data on which is stored at address (OFFSET6+5), and is displayed. After step S466, control passes to step S418.

As described above, when the display switch 4 is switched on, part patterns for a face image corresponding to its characteristics are displayed on the display 12 sequentially, for example, in order of a hair style, a half contour, an eye, .... More particularly, data items on the left-halves of the part patterns which compose the face image except for the hair style are read from the corresponding addresses in the work RAM 9 and displayed. Right-hand halves of the part patterns are duplicated on the basis of the corresponding read left-hand halves of the part patterns, the right- and left-hand of the part patterns corresponding to each other are combined. As required, the position and angle of the combined part patterns are corrected and displayed.

In summary, in the execution of the above program in the present embodiment, the power supply is turned on, respective desired left-hand patterns of the parts which compose the right-hand half of the face image are selected sequentially and a first half face image H1 of patterns of the parts of the left-hand half of the face is first displayed, as shown in FIG. 13A. The first half face image H1 of the face image is used as the original of duplication and is reversed around a vertical line passing through the center V of the VRAM 11 to be a second half face image H2 of part patterns of the right-hand half of the face image. The first half face image H1 and second half face image H2 composed by the part patterns are then combined on the VRAM 11 into a synthetic face image H3, which is then displayed except for the part pattern of the hair style K1, as shown in FIG. 3B. If a desired hair style K1 which is a single complete part pattern as a whole is selected, it is then combined with the synthetic face image H3 on the VRAM 11 into a complete face image H4, which is then displayed, as shown in FIG. 13C.

For example, by turning the right- and left-hand part patterns M1, M2 of the eyebrows through the same angle, a face image H5 having a different appearance and making a different impression due to the rotation of the eyebrow part patterns M1, M2 is displayed, as shown in FIG. 13D.

Thus, only data on each of the part patterns which compose half of the face image except the hair style is required to be stored in the part pattern ROM 10 and no data on the part patterns in the storage area hatched in FIG. 2 is required. Thus, the capacity of the memory therefor is halved compared with a memory capacity which would otherwise be required. In other words, the number of kinds of part patterns which can be stored in the original capacity of the part pattern ROM 10 is doubled. Accordingly, the number of combinations of part patterns is increased and a face image closer to that which the user desires is formed.

When the device of this embodiment is mounted on an electronic device such as an electronic notebook, a reduced storage capacity for the part patterns may be used. Thus, a small lightweight electronic device is provided.

The inventive device is applicable not only to electronic notebooks but also widely to other different articles and fields.

Figure 14:
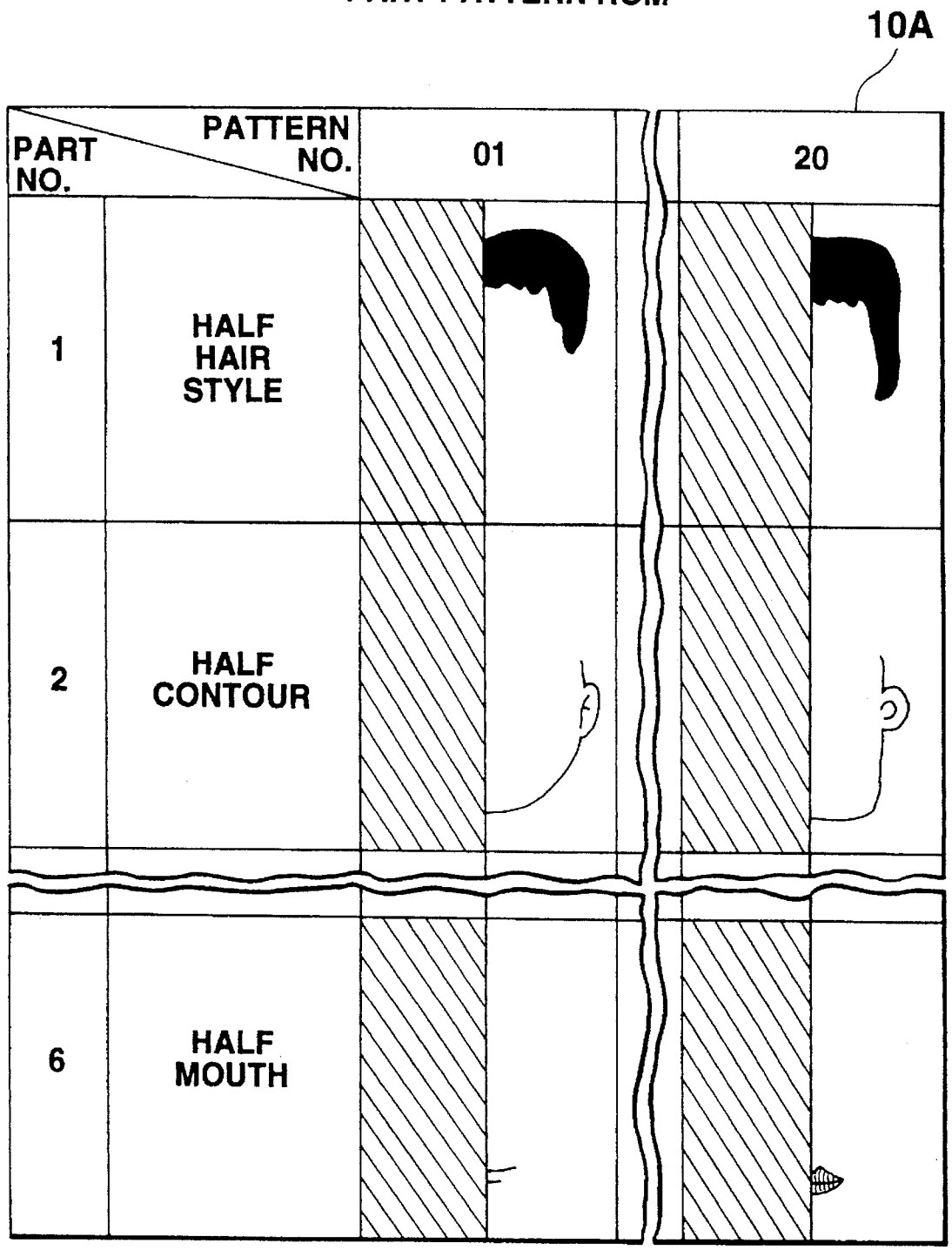
FIG. 14 illustrates examples of other part patterns, data on which is stored in the part pattern ROM.

While in the present embodiment the hair style part pattern K1 as a single piece, data on which is stored in the part pattern ROM 10, is illustrated, data on a half hair style part pattern may be stored in the part pattern ROM 10A like a half contour, an eye, and a half mouth, as shown in FIG. 14.

Also, according to the present invention, apart from the face image, a face image such as a female image, an animal's face image, and a spaceman's face image and the image of an object having right- and left-hand symmetrical half portions are produced easily in a manner similar to the above, with the aid of a storage which stores data on only half of the patterns of the parts which compose the face or the image of the object.

The position and angle of a part pattern is changeable to any position and any angle, respectively.

The finished face image may be not only displayed on the display 12 but also printed on a label tape or a sheet of regular paper by the printer 13 of FIG. 1.

According to the present invention, data on a plurality of parts images data is stored for each of the parts which compose halves of an object. Any images are selected one from among the plurality of parts images data for each of the parts. The selected parts images data are combined into a first half object image. A second half object image symmetrical with the first half object image is formed on the basis of the first half object image. The first and second half object images are combined into a complete object image. Thus, only data on a plurality of images of each of the parts which compose halves of the object is required to be stored compared with the case where data on a plurality of parts images for each of the parts which compose the complete object image is required to be stored. That is, an amount of storage of the images of the respective part patterns is halved, the storage capacity used and the manufacturing cost, size and weight of the whole device are greatly reduced accordingly.

What is claimed is:

1. A face image creation device, in which a face image has plural parts and is represented by a combination of part images of the plural parts, which are disposed at predetermined positions respectively in the face image, and each of the plural parts has a plurality of part images, said face image creation device comprising:

storage means for storing the plurality of part images for each of parts which are to be disposed in a half portion of a face image to be composed, the half portion of the face image corresponding to one of right and left half portions of the face image to be composed when said face image is divided into right and left half portions by an imaging center longitudinal line;

half face image producing means for selecting one part image for each of the parts to be disposed in the half portion of the face image to be composed from among the plurality of part images stored in said storage means, and for disposing the selected part images at the predetermined positions respectively to compose a first half face image of the face image to be composed; and face image producing means for inverting the first half face image composed by said half face image producing means about the imaginary center longitudinal line of the face image to be composed to complete the face image.

2. A face image creation device according to claim 1, further comprising:

output means for outputting the face image completed by said face image producing means.

3. A face image creation device according to claim 1, further comprising:

position changing means for changing the position of the part image of at least one of the parts in the face image completed by the face image producing means to modify the face image.

4. A face image creation device, in which a face image has plural face parts including a hair part and is represented by a combination of part images of the plural parts, which are disposed at predetermined positions respectively in the face image, and each of the plural parts has a plurality of part images, said face image creation device comprising:

first storage means for storing the plurality of part images of each of the face parts other than the hair part, which face parts are to be disposed in a half portion of a face image to be composed, the half portion of the face image corresponding to one of right and left half portions of the face image to be composed when said face image is divided into right and left half portions by an imaginary center longitudinal line;

second storage means for storing a plurality of part images of the hair part;

first object image producing means for selecting one part image for each of the face parts to be disposed in the half portion of the face image to be composed from among the plurality of part images stored in the first storage means, and for disposing the selected part images at the predetermined positions respectively in the half portion of the face image to be composed to compose a first half object image;

second object image producing means for inverting the first half object image composed by said first object image producing means about the imaginary center longitudinal line of the face image to be composed to compose a second object image which is symmetrical about the imaginary center longitudinal line; and face image producing means for selecting one part image of the hair part from among the plurality of part images stored in said second storage means, and for combining the selected part image of the hair part with the second object image composed by said second object image producing means to complete the face image.

5. A face image creation device according to claim 4, further comprising:

output means for outputting the face image completed by said face image producing means.

6. A face image creation device according to claim 4, further comprising:

position changing means for changing the position of the part image of at least one of the parts in the face image completed by the face image producing means to modify the face image.

7. A face image creation method of composing a face image, wherein a face image has plural face parts and is represented by a combination of part images of the plural face parts, which are disposed at predetermined positions respectively in the face image and each face part has a plurality of part images, and the plurality of part images of the face parts are stored in storage means, the method comprising the steps of:

selecting one part image for each of the face parts from among the plurality of part images stored in said storage means, the face parts which are to be disposed in a half portion defined by an imaginary center longitudinal line in a face image to be composed;

disposing the selected part images of the face parts which are to be disposed in the half portion of the face image at the predetermined positions respectively to be composed into a half face image;

inverting the half face image about the imaginary central longitudinal line to compose the face image which is symmetrical about the imaginary central longitudinal line.

8. A face image creation method according to claim 7, further comprising the step of:

outputting the composed face image.

9. A face image creation method according to claim 7, further comprising the step of:

changing the position of the part image of at least one of the face parts in the composed face image to modify the face image.

10. A face image storage device for use with a face image creation apparatus, in which a face image has plural parts and each part has plural part images, and the face image is represented by a combination of the part images of the respective parts which are selected by selecting means and disposed at predetermined positions respectively, the face image storage device comprising:

first storage means for storing the plurality of part images for each of the parts which are to be disposed within a half portion defined in the face image to be composed by the face image creation apparatus; and second storage means comprising first means for combining part images which are selected by the selecting means from among the plurality of part images stored in the first storage means to compose a first half portion of the face image to be composed, and for composing a second half portion of the face image which is symmetrical with the first half portion of the face image, and second means for combining the first half portion composed by said first means and the second half portion into the face image, and for storing the composed face image.

* * * * *